US008930745B2

(12) United States Patent
Endo et al.

(10) Patent No.: US 8,930,745 B2
(45) Date of Patent: Jan. 6, 2015

(54) STORAGE SUBSYSTEM AND DATA MANAGEMENT METHOD OF STORAGE SUBSYSTEM

(75) Inventors: Daisuke Endo, Odawara (JP); Koji Iwamitsu, Odawara (JP); Shigeo Homma, Odawara (JP)

(73) Assignee: Hitachi, Ltd., Tokyo (JP)

( * ) Notice: Subject to any disclaimer, the term of this patent is extended or adjusted under 35 U.S.C. 154(b) by 352 days.

(21) Appl. No.: 13/504,304

(22) PCT Filed: Apr. 16, 2012

(86) PCT No.: PCT/JP2012/002617

§ 371 (c)(1), (2), (4) Date: Apr. 26, 2012

(87) PCT Pub. No.: WO2013/157032

PCT Pub. Date: Oct. 24, 2013

(65) Prior Publication Data

US 2013/0275802 A1 Oct. 17, 2013

(51) Int. Cl.
*G06F 11/00* (2006.01)

(52) U.S. Cl.
USPC .......................... 714/6.12; 714/6.22; 714/6.23

(58) Field of Classification Search
CPC .......................... G06F 11/1092; G06F 11/2094
USPC .................................... 714/6.12, 6, 6.22, 6.23
See application file for complete search history.

(56) References Cited

U.S. PATENT DOCUMENTS 6,845,465 B2 * 1/2005 Hashemi ...................... 714/6.21
7,136,964 B2 11/2006 Yamamoto
7,574,623 B1 8/2009 Goel et al.
7,707,456 B2 * 4/2010 Tanaka et al. ................ 714/6.11
8,024,603 B2 * 9/2011 Kono et al. ..................... 714/6.2
8,386,834 B1 * 2/2013 Goel et al. ...................... 714/6.1
8,484,414 B2 * 7/2013 Sugimoto et al. ............. 711/114
8,656,099 B2 * 2/2014 Saito et al. .................... 711/114
2003/0191881 A1 * 10/2003 Arndt et al. ................... 710/240
2003/0237019 A1 * 12/2003 Kleiman et al. .................. 714/6
2004/0250017 A1 * 12/2004 Patterson et al. ............. 711/114
2005/0210322 A1 * 9/2005 Corrado .......................... 714/13

(Continued)

FOREIGN PATENT DOCUMENTS

JP 2005-149374 A 6/2005

OTHER PUBLICATIONS

PCT International Search report and Written Opinion on application PCT/JP2012/002617 mailed Sep. 5, 2012; 9 pages.

*Primary Examiner* — Loan L. T. Truong
(74) *Attorney, Agent, or Firm* — Foley & Lardner LLP

(57) ABSTRACT

Since the whole storage device is blocked according to the conventional data saving method when failure occurs to the storage device in a storage subsystem, so that when failure occurs to two storage devices at the same time within a same RAID group, double failure is caused and data loss occurs. In order to solve the problem, the present invention divides a storage device into storage areas of predetermined units, constructs RAID groups from two or more storage areas, and when failure occurs to the storage area, selects a data migration destination storage area from either the RAID group in which failure has occurred or the RAID group other than the RAID group in which failure has occurred, migrates the data stored in the storage area where failure has occurred to the selected data migration destination storage area, and blocks only the storage area where failure has occurred.

12 Claims, 17 Drawing Sheets

(56) References Cited

U.S. PATENT DOCUMENTS

| | | | | |
|---|---|---|---|---|
| 2008/0010398 | A1* | 1/2008 | Jiang | 711/103 |
| 2008/0148105 | A1* | 6/2008 | Hisatomi et al. | 714/47 |
| 2008/0276061 | A1* | 11/2008 | Takaoka et al. | 711/170 |
| 2009/0307420 | A1* | 12/2009 | Tanimoto et al. | 711/114 |
| 2009/0307426 | A1* | 12/2009 | Galloway et al. | 711/114 |
| 2010/0312967 | A1* | 12/2010 | Kasai et al. | 711/129 |
| 2011/0153917 | A1* | 6/2011 | Maita et al. | 711/103 |
| 2011/0167219 | A1* | 7/2011 | Klemm et al. | 711/114 |
| 2011/0191537 | A1* | 8/2011 | Kawaguchi et al. | 711/114 |
| 2011/0191629 | A1* | 8/2011 | Daikokuya et al. | 714/20 |
| 2011/0283123 | A1* | 11/2011 | Shigemura et al. | 713/320 |
| 2012/0005504 | A1* | 1/2012 | Fukatani et al. | 713/320 |
| 2012/0059990 | A1* | 3/2012 | Iida | 711/114 |
| 2012/0137099 | A1* | 5/2012 | Shibayama et al. | 711/165 |
| 2012/0278584 | A1* | 11/2012 | Nagami et al. | 711/170 |
| 2013/0073820 | A1* | 3/2013 | Watanabe et al. | 711/162 |
| 2013/0073900 | A1* | 3/2013 | Li et al. | 714/6.22 |
| 2013/0138908 | A1* | 5/2013 | Iwasaki | 711/165 |
| 2013/0198476 | A1* | 8/2013 | Nakajima et al. | 711/165 |
| 2013/0262921 | A1* | 10/2013 | Gao et al. | 714/6.24 |

* cited by examiner

| Page # (6501) | LU# (6502) | Page Allocation Status (6503) | DP-RG# (6504) | Access Frequency (IOPH) (6505) | Page Storage Area Status (6506) | Failure Counter (6507) |
|---|---|---|---|---|---|---|
| 100 | 0 | Allocated | 0 | 23 | Normal | 0 |
| 101 | 1 | Allocated | 1 | 27 | Normal | 2 |
| 102 | 1 | Allocated | 1 | 4 | Normal | 50 |
| 103 | 2 | Unallocated | 1 | 0 | Normal | 0 |
| 104 | 2 | Allocated | 0 | 103 | Blocked | 10 |
| 105 | 2 | Allocated | 0 | 10 | Blocked | 102 |
| 106 | 0 | Unallocated | 1 | 0 | Normal | 0 |
| 107 | 2 | During allocation (during format) | 2 | 0 | Normal | 0 |
| 108 | Undetermined | Unallocated | 2 | 0 | Normal | 0 |

| Content of Failure (7001) | Failure Counter Add Value (7002) |
|---|---|
| Mechanical System Error (Recovered) | 2 |
| Mechanical System Error (Unrecovered) | 50 |
| R/W System Error (Recovered) | 2 |
| R/W System Error (Unrecovered) | 10 |
| Drive I/F System Error (Recovered) | 2 |
| Drive I/F System Error (Unrecovered) | 50 |
| Hardware Error (Recovered) | 2 |
| Hardware Error (Unrecovered) | 50 |

STORAGE SUBSYSTEM AND DATA MANAGEMENT METHOD OF STORAGE SUBSYSTEM

TECHNICAL FIELD

The present invention relates to a storage subsystem and a data management method of a storage subsystem.

BACKGROUND ART

Recently, along with the explosive increase of data and information handled by enterprises and government offices, the amount of data processed in large-scale computers such as host computers or storage subsystems coupled to servers and host computers or the capacity of the stored data is increasing rapidly. Especially, unlike servers and other information processing systems, storage subsystems are specialized for storing data, using a large number of hard disks as data storage media with a large capacity and high reliability, and which is managed and operated via a RAID (Redundant Array of Inexpensive Disks) system.

Further, the prices of storage subsystems are being reduced recently, along with which the hard disk drives (HDDs) used in the devices are switched from expensive and highly reliable fiber channel (FC) type devices to inexpensive SAS (Serial Attached SCSI) type devices and further to even more inexpensive SATA (Serial AT Attachment) type devices.

Further, the capacity of the HDDs are increased by the recent development of high density storage techniques. Along therewith, however, there are concerns that the frequency of occurrence of unrecoverable errors and recoverable errors may increase due to physical defects such as scratches formed on a media as the storage unit of the HDD (defects caused during fabrication or chipping caused by head contact) or read errors caused by insufficient recording, and the risk of data loss is increased.

Patent literature 1 discloses a method for saving data in HDD units when failure has occurred to an HDD as a technique for reducing the risk of data loss due to unrecoverable errors and the like. This technique monitors the failure occurring in one of the data disks of a plurality of data disks constituting one or more RAID groups, and when it is detected that a failure has occurred in a data disk, a correction copy is performed in a spare disk belonging to another spare disk group of the same RAID group as the data disk in which failure has occurred.

CITATION LIST

Patent Literature

PTL 1: Japanese Patent Application Laid-Open Publication No. 2005-149374 (U.S. Pat. No. 7,136,964)

SUMMARY OF INVENTION

Technical Problem

According to this technique, even if a RAID group having an error correction code such as RAID5 is constructed, the whole HDD is blocked when media failure occurs in a portion of the HDD. Therefore, if failure occurs to two HDDs simultaneously within the same RAID group and the HDDs are blocked, double failure occurs and data is lost. The risk of double failure increases as the capacity of the HDD becomes higher.

Therefore, the present invention provides a storage subsystem and a data management method of a storage subsystem capable of reducing data losses due to double failure of the HDD.

Solution to Problem

In order to solve the above problems, the present invention provides a storage subsystem coupled to a host computer, the storage subsystem comprising a storage device unit having a plurality of storage devices for storing data sent from the host computer, and a management unit for managing the storage device unit, wherein the management unit is caused to divide the storage device unit into storage areas of predetermined units, select a data migration destination storage area when failure occurs to the storage area, and migrate data stored in the storage area where failure has occurred to the storage area of the data migration destination, and block the storage area where failure has occurred.

According to another aspect of the present storage subsystem, a RAID group is composed of two or more of said storage areas, and a storage area of the data migration destination is selected from either a first RAID group to which the storage area in which failure has occurred belongs or a second RAID group that differs from the first RAID group, and data is migrated thereto. Even further, a data migration destination RAID group is selected based on either a number of blocked storage areas or a ratio of blocked storage areas in the first RAID group.

According to yet another aspect of the present storage subsystem, if the number of blocked storage areas or the ratio of blocked storage areas in the first RAID group is below a first blockage threshold, the first RAID group is selected as the data migration destination RAID group, and if the above value exceeds the first blockage threshold, the second RAID group is selected as the data migration destination RAID group. Further according to the present storage subsystem, the data migration destination RAID group is selected from a RAID group other than the first RAID group and having the number of blocked storage areas or the ratio of blocked storage areas smaller than the second blockage threshold. According to another aspect of the present storage subsystem, the second RAID group is a spare RAID group that is not used for performing normal operation of the storage subsystem.

Even further, the present storage subsystem selects a data migration storage area when an IO access frequency from the host computer to the storage area exceeds a first access frequency threshold set in advance, migrates the data stored in the storage area to the storage area of the data migration destination, and blocks the storage area.

Advantageous Effects of Invention

According to the present invention, a portion of the interior of the HDD is blocked, so that the risk of data losses caused by double failure of the HDD constituting the same RAID group can be reduced.

BRIEF DESCRIPTION OF DRAWINGS

FIG. 9 is a view showing a configuration example of a page configuration information management table.

FIG. 10 is a view showing a configuration example of a failure count management table.

DESCRIPTION OF EMBODIMENTS

Figure 1:
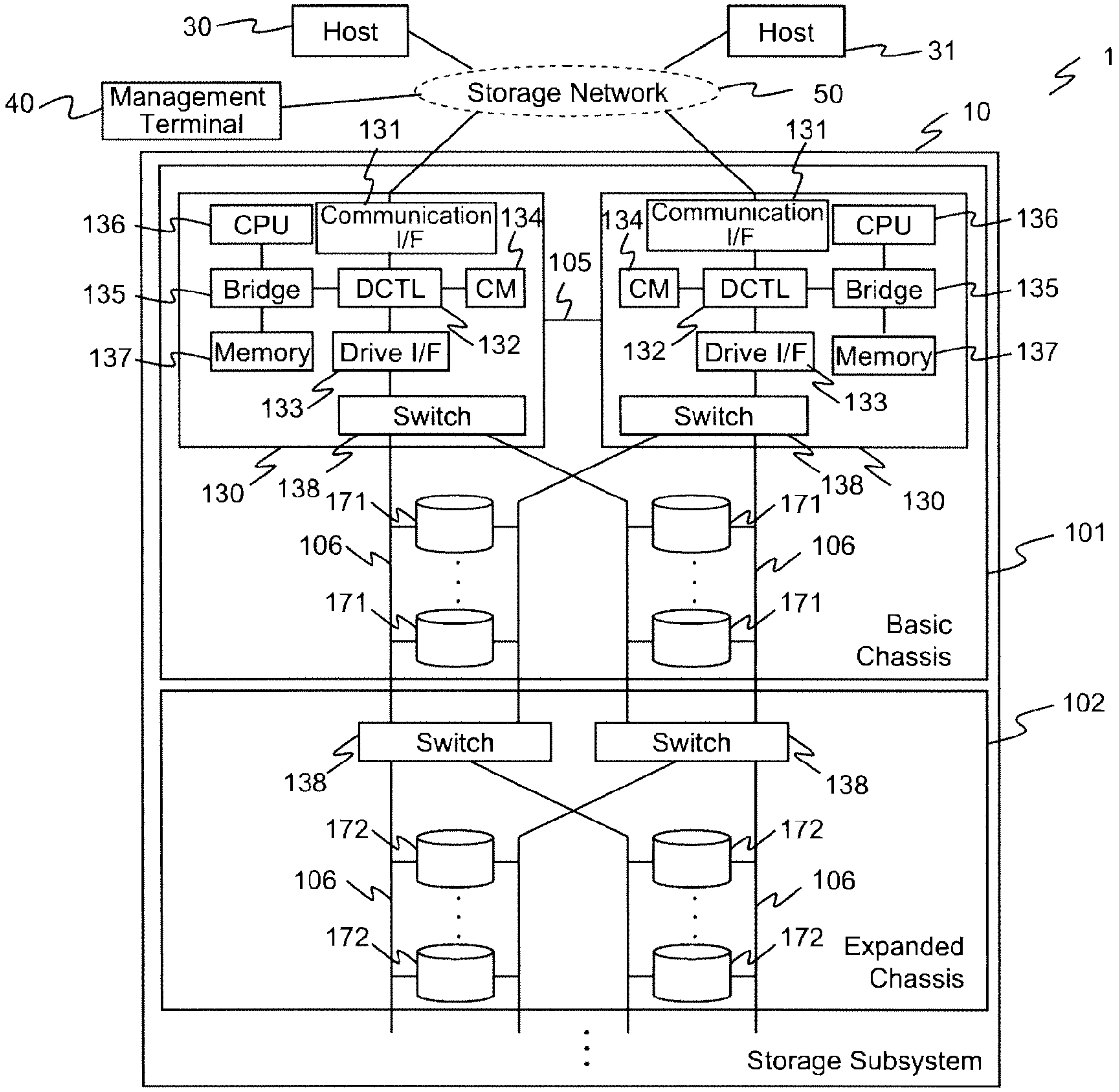
FIG. 1 is a view showing a configuration of the storage system.

Now, the preferred embodiments of the present invention will be described with reference to the drawings. In the following description, various information are referred to as “management table” and the like, but the various information can be expressed via data structures other than tables. Further, the “management table” can also be referred to as “management information” to show that the information does not depend on the data structure.

The processes are sometimes described using the term “program” as the subject. The program is executed by a processor such as a MP (Micro Processor) or a CPU (Central Processing Unit) for performing determined processes. A controller can also be the subject of the processes since the processes are performed using appropriate storage resources (such as memories) and communication interface devices (such as communication ports). The controller can also use dedicated hardware in addition to the CPU. The computer program can be installed to each computer from a program source. The program source can be provided via a program distribution server or a storage media, for example.

Each element, such as an HDD or a controller unit can be identified via numbers, but other types of identification information such as names can be used as long as they are identifiable information. The equivalent elements are denoted with the same reference numbers in the drawings and the description of the present invention, but the present invention is not restricted to the present embodiments, and other modified examples in conformity with the idea of the present invention are included in the technical range of the present invention. The number of each component can be one or more than one unless defined otherwise.

In the following description, the storage device is referred to as a HDD, but it is not restricted thereto, and the present invention can be applied to other types of storage devices such as those composed of flash memories and other nonvolatile semi-conductor devices or rewritable optical disk media.

<Storage System Configuration (FIG. 1)>

FIG. 1 is a view showing a configuration of the storage system. With reference to FIG. 1, the overall configuration of the storage system to which the present invention is applied will be described. A storage system 1 is composed of host computers 30 and 31, a management terminal 40, and a storage subsystem 10. The host computers 30 and 31, the management terminal 40 and the storage subsystem 10 are mutually coupled via a storage network 50.

The above-described storage network 50 is composed of a wired network using metal cables and optical cables, for example, and a typical example is a SAN (Storage Area Network) or a LAN (Local Area Network). It is also possible to have the host computers 30 and 31 and the storage subsystem 10 or the storage subsystem 10 and the management terminal 40 coupled in a wireless manner.

<Internal Configuration of Storage Subsystem>

Next, an internal configuration of the storage subsystem 10 will be described with reference to FIG. 1. The storage subsystem 10 is composed of a basic chassis 101 and an expanded chassis 102.

Further, the basic chassis 101 is composed of a controller chassis formed of a controller unit 130 and a drive chassis including a plurality of HDD drives 171 for storing the data of the host computers 30 and 31.

The expanded chassis 102 is designed to enable a plurality of HDD drives 172 to be stored therein and to be coupled to the basic chassis 101 via an EXP switch 138. Further, the user or the system administrator can increase the total storage capacity of the whole storage subsystem 10 by coupling one or more expanded chassis 102 to the basic chassis 101.

The HDD drives 171 and 172 can be composed of fiber channel (hereinafter referred to as FC) type devices which are expensive and have very high reliability, inexpensive SAS (Serial Attached SCSI) type devices, and SATA (Serial AT Attachment) type devices which are even more inexpensive than the SAS. It is also possible to use SSD (Solid State Drives) composed for example of flash memories which are nonvolatile semiconductor memories, optical disks and magneto optical disks. The plurality of HDD drives constitute one or more RAID groups called ECC (Error Correcting Code) groups.

In order to realize high reliability of the whole device, the storage subsystem 10 adopts a cluster configuration in which the device is composed of two controller units 130, and lines 106 connected to HDD drives 171 are also multiplexed. According to this cluster configuration, even if one of the controller units 130 or connecting lines 106 is stopped or cannot be used due to failure or the like, operation can be continued using the other controller unit 130 or connecting line 106. The two controller units 130 are coupled via an internal bus 105, and they monitor operation statuses mutually.

The controller unit 130 is composed of a communication I/F controller 131 (hereinafter referred to as communication I/F), a data transfer controller (hereinafter referred to as DTCL) 132, a drive I/F controller 133 (hereinafter referred to as drive I/F), a cache memory (hereinafter referred to as CM)

134, a bridge 135, a CPU 136, a local memory (hereinafter referred to as memory) 137, and an EXP switch 138 (hereinafter referred to as switch).

The communication I/F 131 is a controller for realizing communication with the hosts 30 and 31 or the management terminal 40, and performs transmission and reception of I/0 request commands from the hosts 30 and 31 or the management terminal 40 or the write data to the HDD drives 171 and 172 or the read data from the HDD drives 171 and 172.

The DTCL 132 is a controller for transferring the IO request commands to the CPU 136 or transferring the write data to the CM 134. The drive I/F 133 is a controller for realizing communication between the control chassis and the drive chassis.

The CM 134 is composed of a few to a few dozen memory modules each composed of a plurality of DDR (Double Data Rate) type SDRAMs (Synchronous Dynamic Random Access Memories). The CM 134 is a memory storing control information such as various programs and management tables used by the controller unit 130 and temporally storing the user data sent from the host computers 30 and 31 or the user data stored in the HDD drive 171.

In other words, in order to prevent having to access the HDD drive each time which requires a long access time, a portion of the user data in the HDD drive is stored in the CM 134 capable of being accessed in a shorter time then the HDD drive so as to enhance the speed of access from the host computers 30 and 31 to the storage subsystem 10.

The CPU 136 is a processor for controlling the whole controller unit 130 of the storage subsystem 10. The memory 137 is a memory for enabling the CPU 136 to access the control information, the management information and other data at high speed. The memory 137 is also composed of a plurality of nonvolatile memory modules, similar to the CM 134.

The bridge 135 is a controller for controlling the transmission and reception of the I/O request commands, the control information, the management information and other data among the CPU 136, the memory 137 and the DTCL 132. The switch 138 is a controller capable of controlling the coupling between the drive I/F 133 and the HDD drives 171 and 172, having a function also called a SAS expander, enabling to couple a greater number of SAS type FIDDs than the number determined by standard.

<Tier Configuration of Storage Area>

Figure 2:
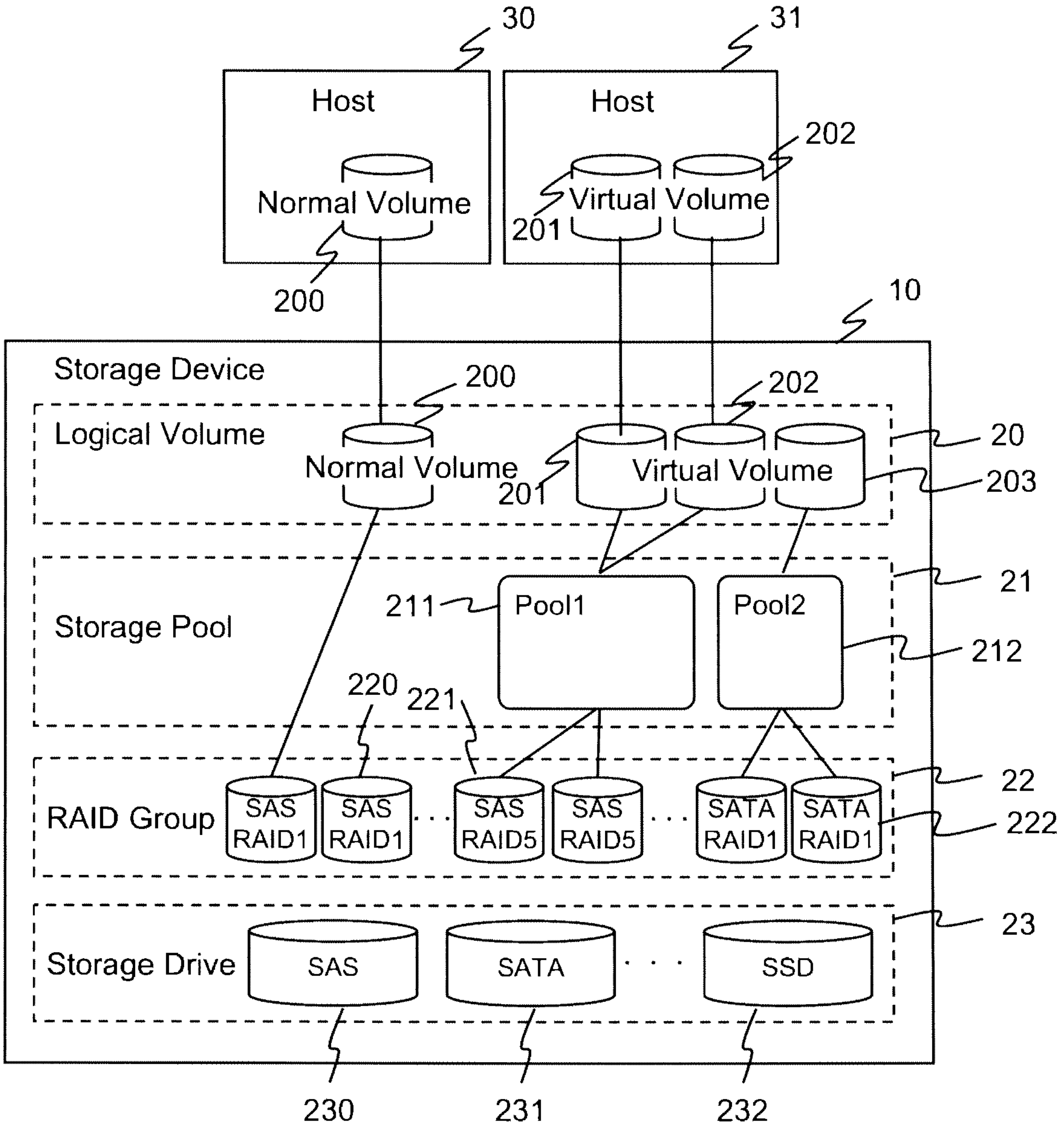
FIG. 2 is a conceptual diagram showing the correspondence between host computers and tiered storages of the storage subsystem.

FIG. 2 is a conceptual diagram showing the correspondence of tiered storages in the storage subsystem and the host computer. Now, we will now describe the types of tiered storages in the storage subsystem 10 and the allocation of tiered storages to the host computer with reference to FIG. 2.

Tiered storage of the storage subsystem 10 is composed of, in the named order from the upper tier, a logical volume 20, a storage pool 21, a RAID group 22 and a storage drive 23. The logical volume 20 has virtual volumes 201 through 203 created therein in addition to a normal volume 200, which are allocated as volumes used by the host computers. In the example of FIG. 2, a normal volume 200 is allocated to the host computer 30 and the virtual volumes 201 through 203 are allocated to the host computer 31, wherein the normal volume or the virtual volumes are used for transmitting and receiving data with the storage subsystem 10.

Further, the normal volume 200 has a RAID group 220 (in FIG. 2, SAS disks 230 constitute RAID level 1) directly allocated thereto without passing the storage pool 21. The storage pool 21 is an assembly storing a plurality of pages which are a minimum unit for managing a real storage area to be allocated to the virtual volume. The storage pool 21 has different pools corresponding to the environment of use of the virtual volume by the host computer.

For example, the pool includes a Pool1 211 composed of RAID group (RG) pages of RAID level 5 using SAS disks 230 of the storage drive 23, and a Pool2 212 composed of RAID group pages of RAID level 1 using SATA disks 231. Further, it is possible to compose RAID groups using SSD 232. According to the present invention, the aforementioned RAID groups are called DP-RG (Dynamic Provisioning-RAID Group). Pages of the Pool1 211 are allocated to the virtual volume 201 and virtual volume 202 and pages of the Pool2 212 are allocated to the virtual volume 203 when a write request from the host computer is received.

<Concept of Dynamic Real Area Allocation Function>

Figure 3:
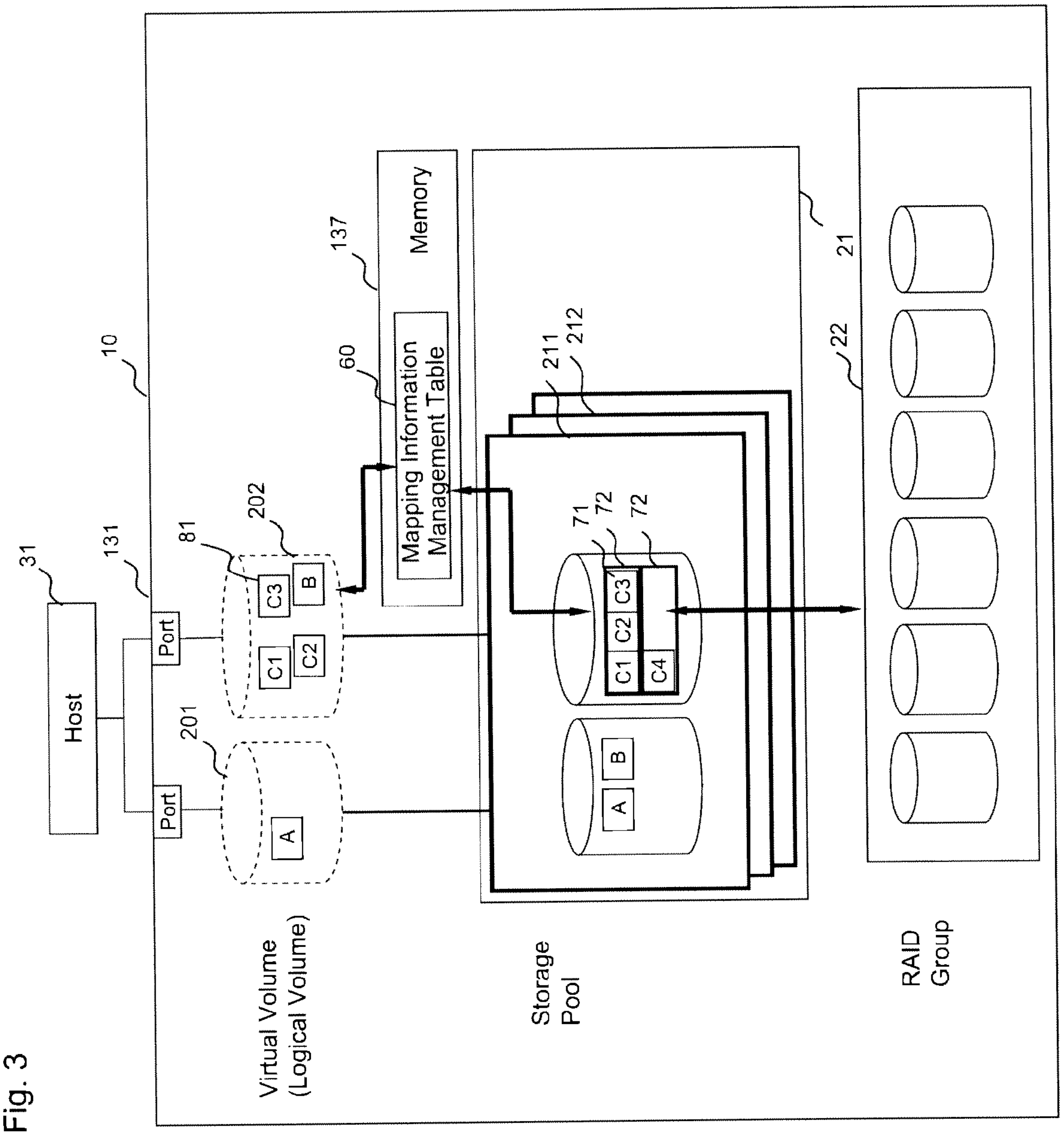
FIG. 3 is a view showing one example of a correspondence between virtual pages and real pages allocated to written areas.
Figure 4:
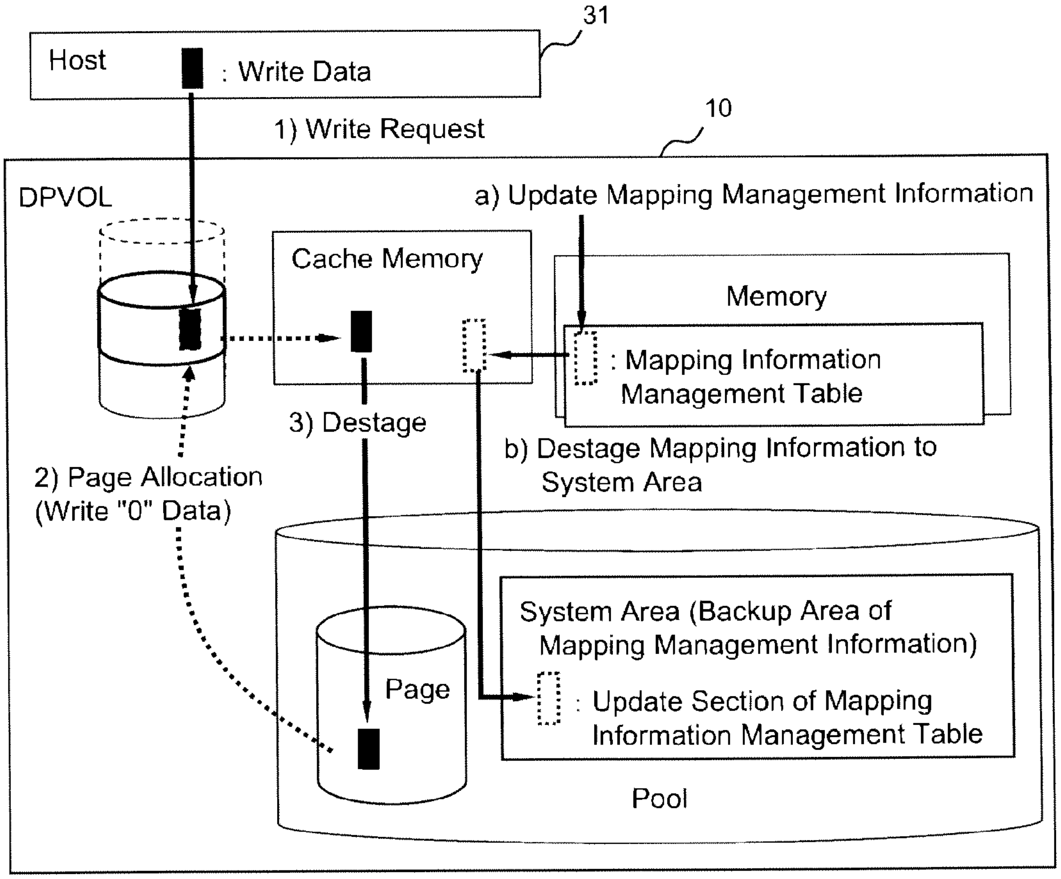
FIG. 4 is a view illustrating an allocation operation of a real page to a virtual page.

The actual allocation operation will be described with reference to FIGS. 3 and 4. FIG. 3 is a view showing one example of the correspondence between virtual pages and real pages allocated to written areas. FIG. 4 is a view illustrating the allocation operation of a virtual page to a real page. FIGS. 3 and 4 illustrate the concept of the dynamic real area allocation function called thin provisioning or dynamic provisioning. A dynamic real area allocation function is for allocating a virtual volume having a greater capacity than the physical capacity to the host computer or the like and allocating the necessary physical storage area in response to a data write request.

In other words, a controller unit 130 of the storage subsystem 10 provides a plurality of virtual volumes to the host computer 31 and manages the storage pool composed of multiple physical storage areas. Then, when a write request is received from the host computer 31 to the area in which a physical storage area has not been allocated out of the virtual storage area of the virtual volume 201, the controller unit 130 allocates to the virtual area a physical storage area from the storage pool 211.

The physical storage area of the RAID group 22 is divided into striped chunks 72. Each chunk 72 is composed of continuous multiple extents 71.

Each virtual volume 201 and 202 is composed of a plurality of virtual storage areas 81 (hereinafter referred to as virtual extents). The size of the virtual extent 81 is the same as the size of the extent 71.

For example, the size of a single extent 71 is 32 MB, wherein one chunk 72 is composed of 32 extents and has a size of 1 GB, whereas the virtual volume 201 is composed of 10 chunks and has a size of 10 GB.

It is also possible to not introduce the concept of dividing the chunks into extents. In that case, the storage area is referred to as pages in the following description. For example, it is possible to form a virtual volume having a capacity of approximately 1 GB with 25 pages with a page size of 42 MB.

The above-described numerical values are a mere example, and the range of the present invention is not restricted by these numerical values. The page size, the extent size, the chunk size and the virtual volume size can be set variably.

<Real Area Allocation Operation>

A write request (write command and write data) from a host computer 31 to a virtual page 81 of a virtual volume 202 (DPVOL (Dynamic Provisioning Volume)) is sent via a port (communication I/F) 131 of the storage subsystem 10 to a DCTL 132.

The DCTL 132 having received the write request transfers the write command to a memory 137, and the CPU 136 executes the write processing. At first, a write processing when the storage area is managed via chunks will be described. The CPU 136 having received the write command determines whether a chunk has been allocated to the virtual volume being the target of the write request. If a chunk has not been allocated to the virtual volume being the target of the write request, the CPU 136 allocates a chunk to the virtual volume. Then, the CPU 136 allocates an extent within the allocated chunk. If a chunk has already been allocated to the virtual volume and a vacant extent exists within the chunk, the CPU allocates the vacant extent in response to the write request. Next, a write processing when the storage area is managed via pages will be described. The CPU 136 having received the write command determines whether a page 71 has been allocated to the virtual page 81 being the target of the write request.

If a page 71 has not been allocated to the virtual page 81 being the target of the write request, the CPU 136 allocates a predetermined page 71 to the virtual page 81 having received the write request, and updates a mapping information management table 60 (described later) stored in the memory 137.

Next, the CPU 136 stores the write data in the area of the CM 134 designated by the mapping information management table 60. If a page 71 is already allocated to the virtual page 81 having received the write request, the CPU 136 reads the data of the allocated page at first, and matches the write data and the read data.

Thereafter, the CPU 136 stores the matched data in the area of the CM 134 designated by the mapping information management table 60. The mapping information management table 60 enables to manage the location where the entity of the data in the virtual volume is stored in the actual area of the pool volume. The details will be described later.

Lastly, a data control unit 220 executes destaging (writing operation of data only existing in the CM 137 to the storage drive 23) of the write data at a certain timing (periodically or at a processing standby time during which time no processing is performed by the data control unit 220, for example). At the same time, the mapping information management table 60 also executes destaging of data to the system area which is a backup area. The above described operation is the allocation operation of a real storage area to a virtual volume.

<Partial Blockage of Storage Device>

Figure 5:
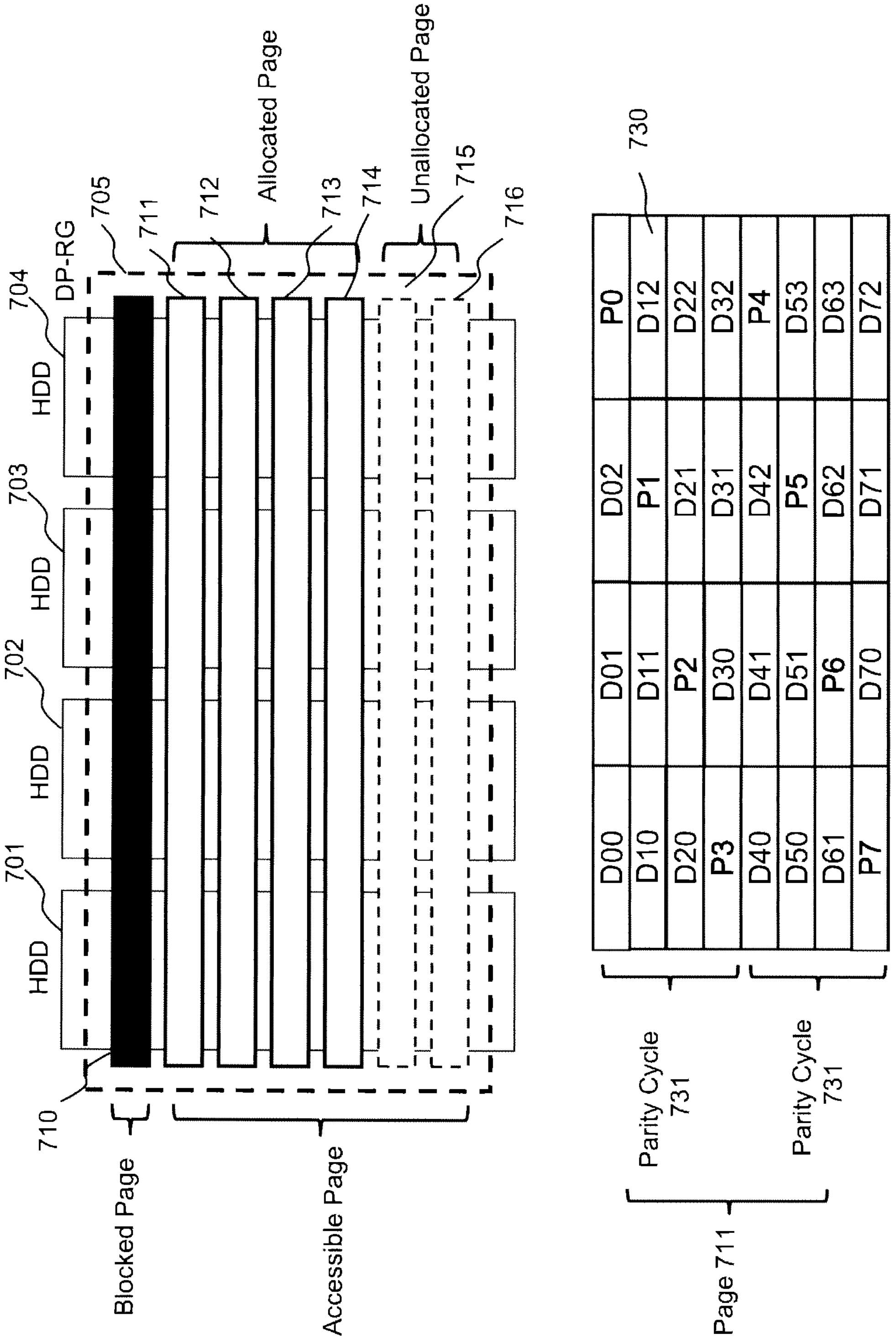
FIG. 5 is a conceptual diagram illustrating a partial blockage of the HDD according to the present invention.
Figure 6:
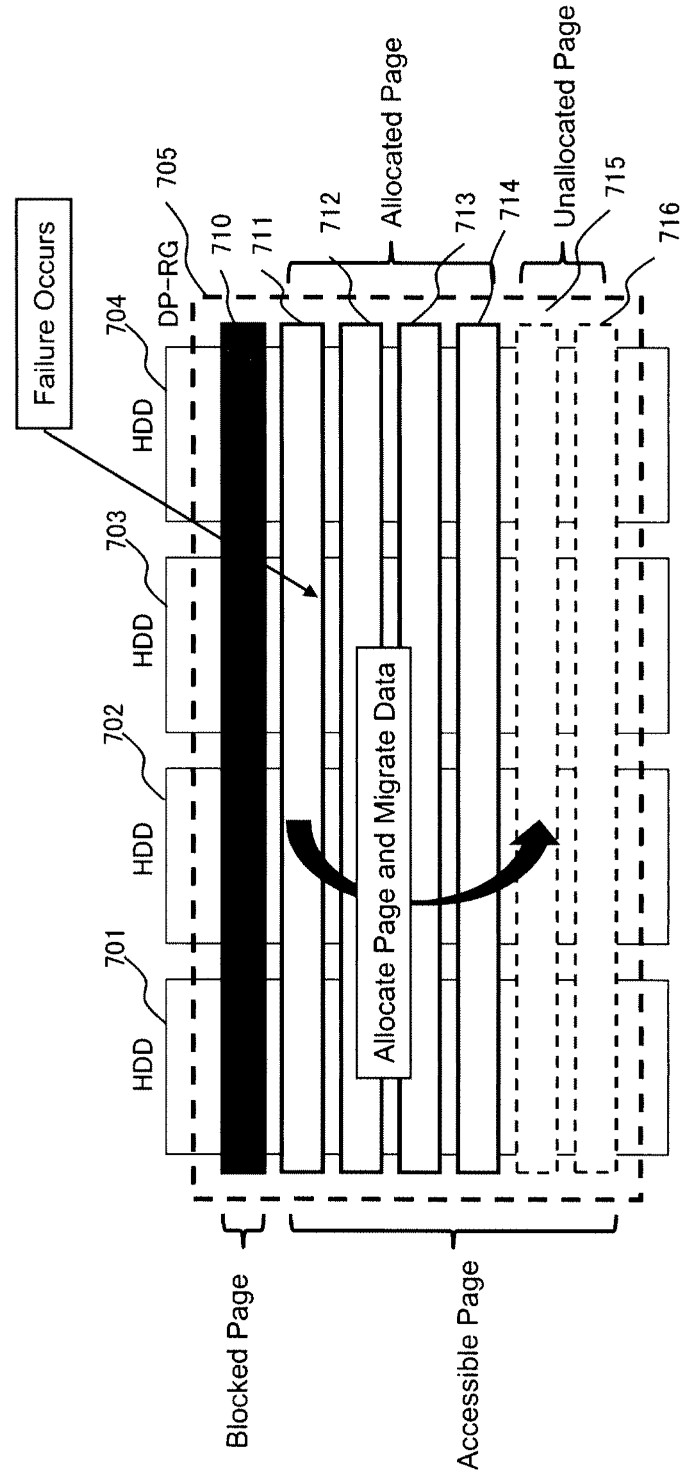
FIG. 6 is a conceptual diagram illustrating the partial blockage of the HDD according to the present invention.
Figure 7:
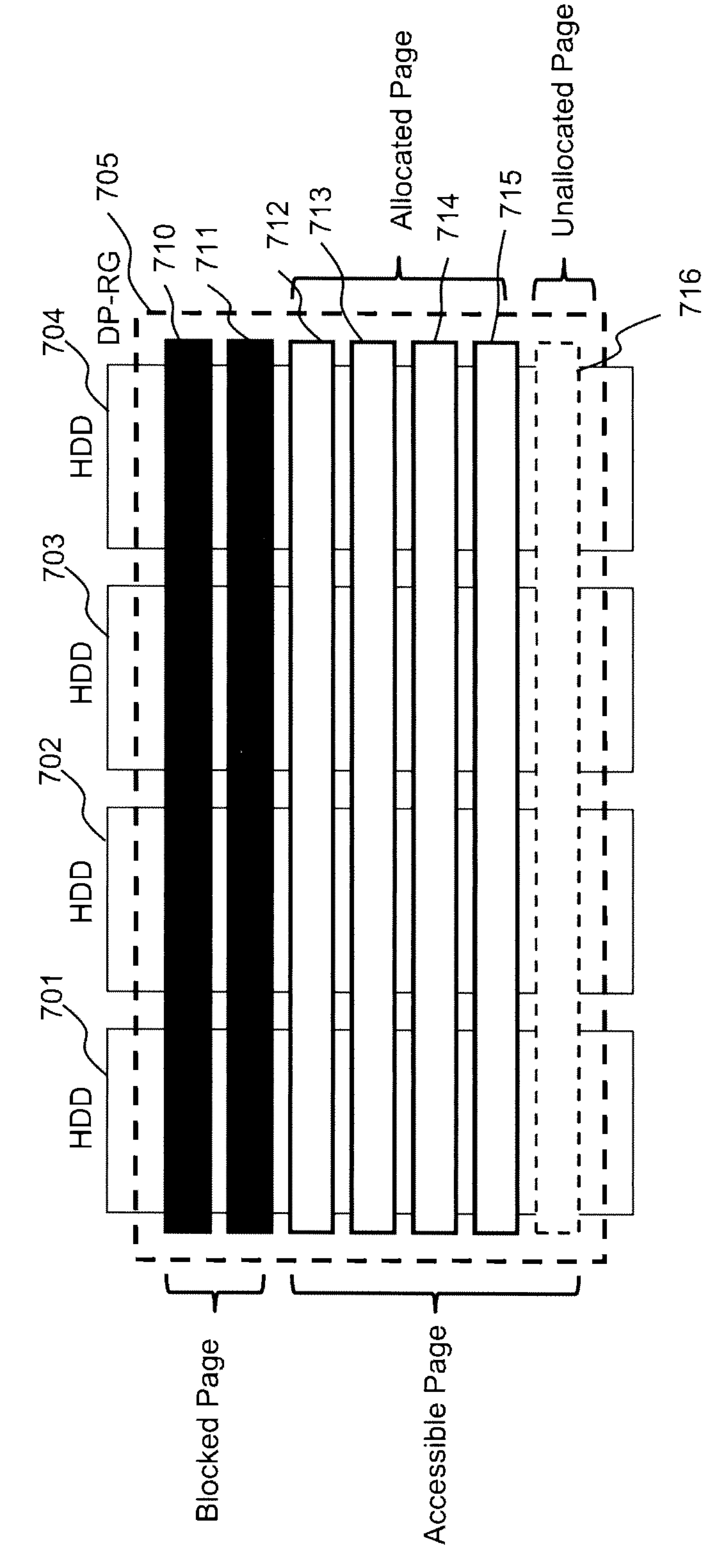
FIG. 7 is a conceptual diagram illustrating the partial blockage of the HDD according to the present invention.

FIGS. 5 through 7 are conceptual views illustrating the partial blockage of the HDD according to the present invention. Next, the outline of the present invention will be described with reference to FIGS. 5 through 7. In the following description, an example of migrating data in page units will be described in detail. If data is to be migrated in chunk units, the term page should be replaced with the term chunk.

In the present drawings, a single DP-RG 705 is composed of four HDDs (HDDs 701 through 704), and the RAID level is RAIDS (3D+1P). Further, the DP-RG 705 is composed of a plurality of pages divided into striped shapes (pages 710 to 716).

Furthermore, four columns of data columns 730 constitute a single parity cycle 731, and a plurality of parity cycle data 731 constitute a single page data area. In other words, a data column is composed of three data (Dxx) and a parity (Px) which is an error correction code, as shown in FIG. 5. More practically, D00, D11, D02 and P0 constitute a single data column 730. Similarly, D10, D11, D12 and P1 constitute a single data column 730. The following data columns are composed similarly as the above data columns.

When focusing on a single parity cycle 731 and a storage HDD, data D00/D10/D20 and a parity P3 are stored in an HDD 701. Similarly, data D01/D11/D30 and parity P2 are stored in HDD 702, data D02/D21/D31 and parity P1 are stored in HDD 703, and Data D12/D22/D32 and parity P0 are stored in HDD 704. Similarly, a chunk is composed of multiple parity cycles. Since the extent is formed by dividing the chunk into multiple areas, the extent includes a part of the parity cycle. For example, extent A contains D00, D01 and D02, and extent B contains P0, D10 and D11.

According to the present invention, when failure occurs as shown in FIG. 6, the following processes (MG1) through (MG3) are executed to block not the whole HDD but a portion of the HDD, that is, to block page unit areas or chunk unit areas.

(MG1) Allocation of Unused Pages to Data Migration Destination

In an allocated page 711, when failure occurs during the I/0 request from the host device (host computer) 31 or during online verification (such as when failure occurs to the HDD 701), the failure is detected by the drive OF 133 and notified to the CPU 136. The CPU 136 having received the failure notice selects an appropriate page from the unallocated pages within the same DP-RG, which is the unallocated page 715 in FIG. 6, and allocates page 715 to the virtual area to which the failure page 711 occurred has been allocated.

(MG2) Migration of Data in Failure Occurrence Page to Allocated Page (Data Replication)

Next, the CPU 136 executes reading of data from a failure occurrence page 711 which is the data migration source page. If reading of data succeeds, the data is stored in an allocated page 715 which is the data migration destination page.

If reading of data is not successful, the CPU 136 executes correction copy using the three HDDs other than the failure occurrence HDD 701, and the correction read data is stored in the allocated page 715. The CPU 136 executes the above operations until data migration corresponding to a single page is completed.

(MG3) Update of Mapping Information Management Table 60

After data migration is completed, the CPU 136 updates the mapping information management table 60 and changes the page allocation to a virtual area. FIG. 7 shows the state in which the operations of (MG1) through (MG3) have been completed. In the present invention, only the data of the failure occurrence page 711 is migrated to a newly allocated page 715 within the same DP-RG so as to block only the failure occurrence page 711, so that it is not necessary to block the whole HDD.

Further, the page being migrated in page or chunk units includes a generated parity within the page or the chunk, and as described earlier, is composed of an integral multiple of the parity cycle 731. Therefore, in order to migrate a page or a chunk, it is not necessary to perform calculation for generating a new parity, so that there is a merit in that data can be migrated easily and speedily, and that the page or the chunk can be easily managed. An extent does not include a parity cycle, so parity calculation must be performed for data migration.

<Information Management Table>

Next, the various tables used in the present invention will be described with reference to FIGS. 8 through 10. The groups of various tables shown in FIGS. 8 through 10 are stored in the CM 134 and copied when necessary to the memory 137 to be used by the CPU 136.

<Mapping Information Management Table>

Figure 8:
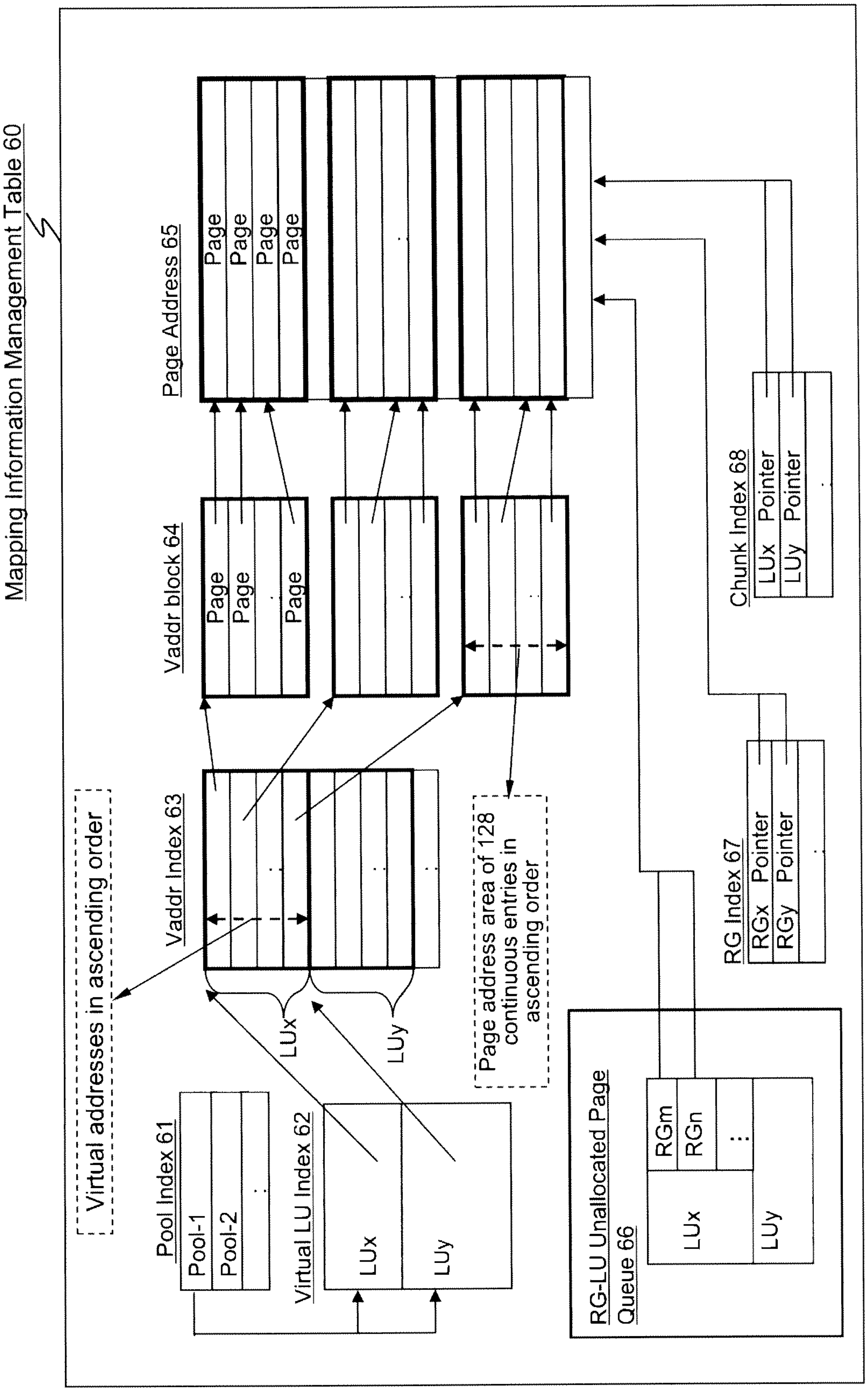
FIG. 8 is a view showing a configuration example of a mapping information management table.

FIG. 8 is a view showing a configuration example of a mapping information management table. As described earlier, the mapping information management table 60 is a management table for managing the location and pool volume in which the entity of the data of the virtual volume is stored. The mapping information management table 60 is composed of the following tables and information.

(MPT1) Pool Index

A pool index 61 is information for managing the configuration (including the state and the attribute) of a storage pool 21 such as the identification number of a RAID group 22 managed via the storage pool 21. A "state" refers to information showing whether the state of each pool is normal/blocked/recovering/degenerated (partially blocked). An "attribute" refers to the information of each pool such as the storage drive type/RG/tier/power save state or the like. Actually, "Pool1" which is the entry 610 of the pool index 61 denotes entry "LUx" and entry "Lily" of the virtual LU (Logical Unit) index 62.

(MPT2) Virtual LU Index

A virtual LU index 62 is the management information for managing information related to configuration of the virtual volumes 201 and 202 and the like. The virtual LU index 62 manages information such as an identification number of a chunk 72 allocated to the virtual volume 201 or the linked virtual address index 63.

(MPT3) Virtual Address Index

A virtual address index 63 is the management information for managing the pointer to a virtual address block information 64. Virtual addresses are stored in ascending order in the entry of the virtual address index 63.

(MPT4) Virtual Address Block Information

A virtual address block information 64 is the management information for managing the pointers to a page address information 65. The virtual address block information 64 is an area of continuous page addresses corresponding to 128 entries, wherein the page addresses are arranged in ascending order.

Further, for example, if the volume size of the virtual volume 201 is 10 GB, the virtual address index 63 manages the virtual address area of the virtual volume 201 by dividing the same into 4 GB areas. Incidentally, the size of the first and second areas is 4 GB, and the size of the last area is 2 GB. The virtual address block information 64 can manage the areas of the virtual volume in 4 GB units.

As described according to the present embodiment, the virtual address area such as the virtual volume 202 is subjected to tier management by dividing the virtual address area into two levels, a virtual address index 63 and a virtual address block information 64. By such tier management, when a CPU 136 attempts to specify a page address information, for example, the CPU can perform the search by narrowing the search range, so that the target page 71 can be accessed speedily. Further, the aforementioned numeric values (10 GB, 4 GB, 2 GB) are mere examples of the present embodiment, so the various numeric values of the present invention can be set variably without restriction to the aforementioned values.

(MPT5) RG-LU Unallocated Page Queue

An RG-LU unallocated page queue 66 is a queue storing unallocated pages of each pool RG-LU, which stores a head pointer and a tail pointer of an unallocated page queue.

(MPT6) Pool RG Index

A pool RG index 67 is management information for managing the chunk information belonging to each RAID group 220, 221 and 222 of RAID group 22 managed via the storage pool 21. Further, the pool RG index 67 manages the RG pointers and the number of chunks.

(MPT7) Chunk Index

A chunk index 68 is a mapping table for chunks, which is the management information for managing the pointer of each chunk 72 belonging to each RAID group 220, 221 and 222 of RAID group 22 managed via the storage pool 21.

(MPT8) Page Address Information

Page address information 65 is management information for managing the configuration information of each virtual page 81 constituting the virtual volume 202 or the like. It includes a physical address showing the physical page associated with the virtual page and the page status, for example. The present invention stores and manages the information unique to the present invention in the page address information 65 such as the access frequency of pages and the status of the storage areas corresponding to pages, so as to enable partial blockage of the interior of the HDD.

FIG. 9 is a view showing a configuration example of a page configuration information management table. FIG. 10 is a view showing a configuration example of a failure count management table. Next, we will describe a page configuration information management table 650 which is the management table of the page address information 65 with reference to FIGS. 9 and 10. For convenience of description, the page configuration information management table 650 is illustrated as if it is a separate information from the page address information 65, but actually, the status of each page can be managed by only the page address information 65.

The page configuration information management table 650 includes a page number 6501, an LU number 6502, a page allocation status 6503, a DP-RG number 6504, an access frequency (IDPH: IO per Hour) 6505, a page storage area status 6506 and a failure counter value 6507.

The page number 6501 is an identifier for specifying pages. The LU number 6502 is the information for identifying an LU to which a page is allocated. The page allocation status 6503 is the information on the status of whether a relevant page is allocated to a virtual area or not, and stores one of the following statuses set via the CPU 136 or the like, which are "allocated (used)", "unallocated (unused)", "during allocation (during format)", "freeing" and so on.

The DP-RG number 6504 sets the number of the RAID group to which the relevant page belongs. The access frequency (IDPH: IO Per Hour) 6505 is for storing the measured IO access frequency (hereinafter referred to as access frequency) of the relevant page. The present invention focuses on the possible increase of failure of media of the storage drive 23 along with the increase of access frequency, and realizes the partial blockage of HDD based on the access frequency as described later. In the present embodiment, the access frequency is set as the IO count per hour, but the IO count can be measured for a shorter period of time (such as per minute), or the IO count can be measured for a longer period of time (such as per day).

The page storage area status 6505 relates to the status information showing whether the data storage state of the relevant page is normal or abnormal, which is indicated by information such as "normal" and "blocked (abnormal)".

The failure counter value 6507 is for accumulating and storing a failure count add value based on the failure contents illustrated in FIG. 10 every time a failure is discovered through online verification or reading/writing performed to the storage drive 23. It is also possible to provide a failure counter 6507 corresponding to each failure content shown in FIG. 10. Further, it is possible to provide a table corresponding to storage drives constituting RAID groups, and when failure occurs to a certain page, the failure location can be isolated further within the drive in which the failure has occurred, and the location can be counted. In such example, even if a failure occurs in a certain page, the page migration described later can be determined in further detail based on which drive the failure has occurred.

In the present invention, the data of a page (migration source page) in which the failure counter value 6507 has exceeded a predetermined threshold is migrated to a different page (migration destination page), and the migration source page is blocked.

According to an actual example of the contents of the page configuration information management table 650, the page where the page number 6501 is "100" is in allocated status, the access frequency is "23", the failure count is "0" and the page status is "normal". On the other hand, the page "104" also in allocated status is in blocked status, since the access frequency is as high as "103". Similarly, page "105" is also in blocked status, since the failure count is as high as "102". The migration to the blocked status will be illustrated later.

Next, a failure count management table 700 will be described. The failure count management table 700 is composed of a content of failure 7001 and a failure count add value 7002, as shown in FIG. 10.

Each item of the content of failure 7001 has combined the error type (mechanical system error, read/write (R/W) system error, drive I/F system error, hardware error and so on) with the failure recovery property (recovered/unrecovered), to which is assigned a failure count add value 7002 weighted based on each content of failure. The failure count of an unrecovered error in which the recovery of the failure is most difficult is set highest.

A mechanical system error refers to a mechanical error of the interior of the HDD, which is an error caused for example by a magnetic head positioning error or a storage media rotation speed error. The error is detected by a controller within the HDD and an operation to solve the error is executed. A drive I/F 133 reads a status resistor within the HDD or the like and detects the failure.

A read/write (R/W) system error refers to an electrical error within the HDD, such as a CRC (Cyclic Redundancy Check) error or the like that occurs when the reading/writing of data from/to a storage media or a verification operation thereof is executed. When this CRC error occurs, the error is detected by a controller within the HDD, which executes a retry operation for solving the error, and the drive I/F 133 reads a status resistor within the HDD or the like and detects this failure.

A drive IT system error is one type of hardware error, which is a failure of the UF controller or the drive UF 133 within the HDD, which can be detected via self diagnosis by the CPU 136 checking a status resistor of the controller or via a BIST (Build In Self Test).

<Basic Operation of HDD Partial Blockage During HDD Failure>

Figure 11:
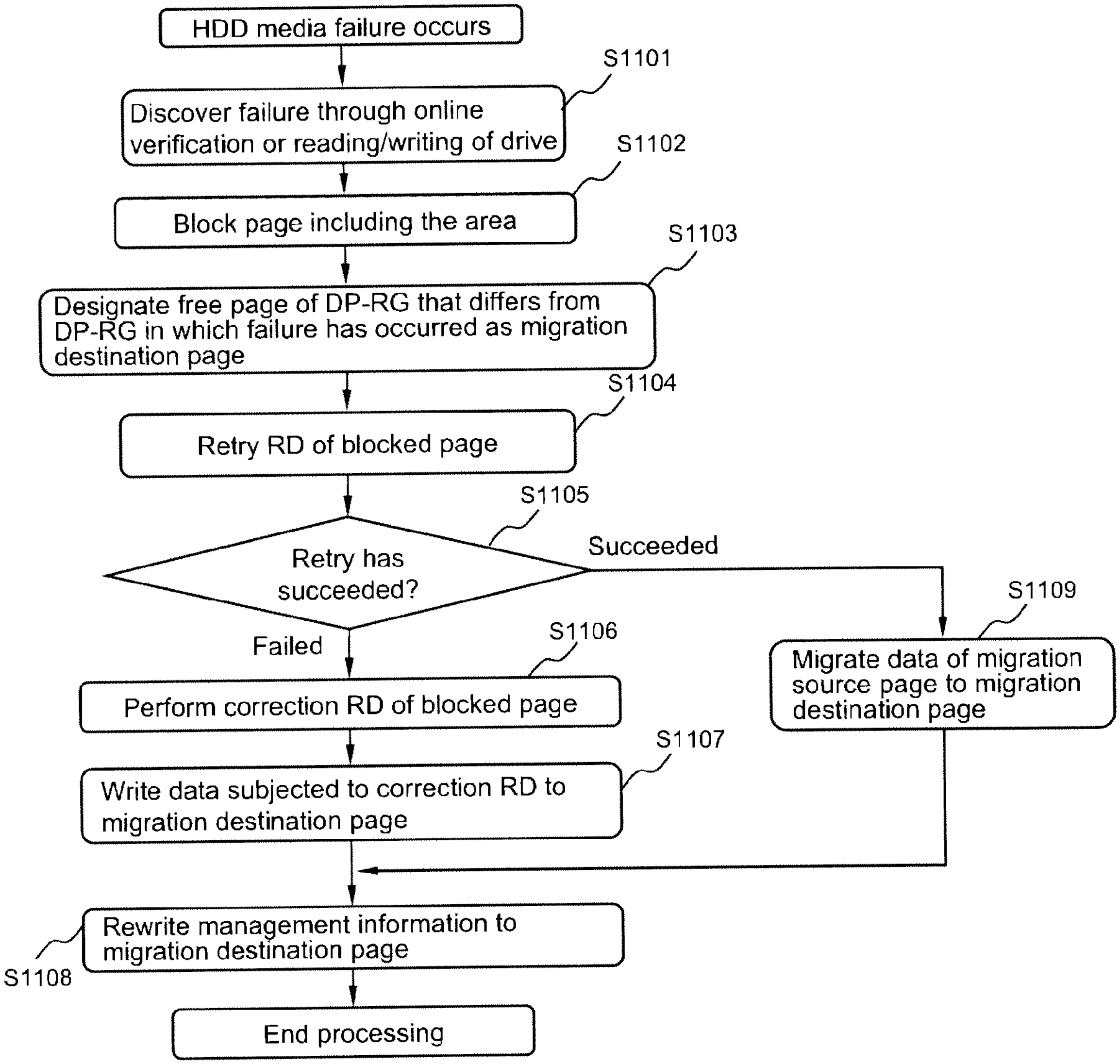
FIG. 11 is a flowchart showing a basic operation of partial blockage of HDD when failure occurs in the HDD.
Figure 12:
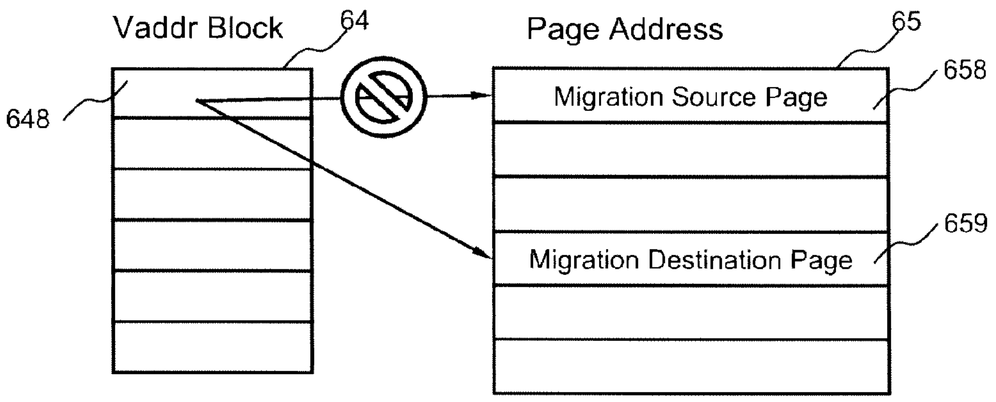
FIG. 12 is a view showing an update operation of the page management information.

FIG. 11 is a flowchart showing a basic operation of a HDD partial blockage when HDD failure occurs. FIG. 12 is a view showing an update operation of page management information. Next, the basic operation of an HDD partial blockage during HDD failure according to the present embodiment will be described with reference to FIGS. 11 and 12.

The drive IT 133 discovers a failure through online verification to the storage drive 23 or during reading/writing accesses performed by the host device (S1101). The drive I/F 133 having detected the failure transmits a failure notice and a failure information to the CPU 136. The CPU 136 having received the failure notice analyzes the failure information, specifies a page including the data storage location in which failure has occurred, and specifies the content of failure 7001.

Next, the CPU 136 adds a failure count add value 7002 corresponding to the content of failure 7001 to a failure count value 6507 (page configuration information management table 650) of the specified failure page in the failure count management table 700. Next, the CPU 136 compares the failure count 6507 after addition with a predetermined failure threshold value. If the failure threshold value is exceeded, the CPU 136 changes the content of the page storage area status 6506 of the page configuration information management table 650 from "normal" to "blocked" so as to block the specified page (S1102).

Next, the CPU 136 examines a DP-RG number 6504 (page configuration information management table 650) of the failure page. Since the DP-RG number of the failure occurrence page is "0", the CPU 136 selects a free page (unallocated page) having a DP-RG number other than "0" from the RG-LU unallocated page queue 66. Then, the CPU 136 designates a migration destination page from the selected unallocated page of the other DP-RG. Then, the CPU 136 changes the page allocation status 6503 (page configuration information management table 650) of the selected migration destination page from "unallocated" to "allocated" (S1103).

For example, it is possible to select a migration destination page from the page configuration information management table 650 shown in FIG. 9. That is, if failure occurs in a page having "100" as the page number 6501, the page "106" in which the DP-RG number 6504 is "1" is selected as the migration destination page. However, the migration destination page can be selected within the same DP-RG. The DP-RG of the migration source page and the DP-RG of the migration destination page are separated in consideration of the tendency that based on the characteristic of the storage drive, the probability of a failure occurring in the same DP-RG including the page in which failure has occurred is higher than the probability of a failure occurring in a different DP-RG.

Next, the CPU 136 orders re-execution of reading of a blocked page (S1104). When re-execution of the reading of a blocked page succeeds, the CPU 136 migrates the data of the read page to the migration destination page (S1109). After completing data migration, the CPU 136 executes step S1108.

When re-execution of reading of the blocked page fails, the CPU 136 executes a correction reading process of a normal storage drive (S1106). Next, the CPU 136 recovers the data in the storage drive in which failure has occurred from the data read through correction reading, and the data read via correction reading and the recovery data are written into the migration destination page (S1107).

Lastly, the CPU 136 changes the pointer of the virtual address block information 64 to the page address information 65. Actually, as shown in FIG. 12, a pointer 648 of the virtual address block information 64 is changed from the state pointing to a page address information 658 of the migration source page to the state pointing to a page address information 659 of the migration destination page.

The above operations were described under the assumption that the operations are executed by the CPU 136, but the operations can be executed not only by the CPU 136 but also by the DCTL 132 or the drive UF 133. Further, the processes can be executed through cooperation of the CPU 136, the DCTL 132 and the drive OF 133.

As described, by designating a free page of a DP-RG that is different from the DP-RG in which the failure page belongs as a migration destination page and migrating the data of the failure occurrence page thereto, it becomes possible to reduce the risk of data loss caused by double failure. Further, since the correction copy capacity can be reduced to approximately 1/65000 (HDD capacity: 2 TB, page size: 32 MB) compared to the case where the whole HDD is blocked (approximately 10 hours in a 2 TB SATA type HDD), the data recovery time can also be shortened. Further, the migration destination page can be selected within the same DP-RG.

<Basic Operation of Page Blockage by Access Frequency>

Figure 13:
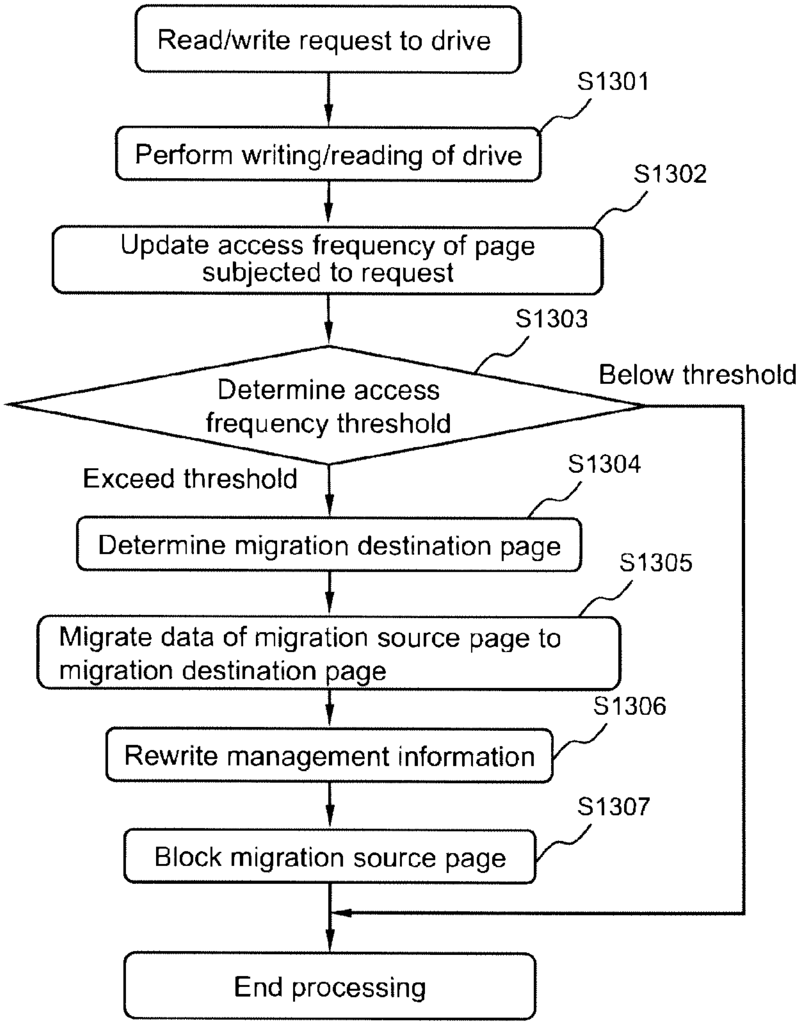
FIG. 13 is a flowchart showing a basic operation of page blockage based on access frequency.

FIG. 13 is a flowchart illustrating a basic operation of page blockage by access frequency. Next, we will describe the basic operation of page blockage (HDD partial blockage) based on access frequency. According to this process, the data stored in a page having a high access frequency is migrated to a different page prior to occurrence of failure, so as to reduce in advance the influence caused when failure occurs (such as deterioration of access performance). This feature focuses on the point that the probability of occurrence of failure is higher in pages having higher access frequency.

At first, a write access request or a read access request is sent from the host computer 31 or the like to the storage drive 23 (S1301). Next, the CPU 136 updates the access frequency 6505 (page configuration information management table 650 of FIG. 9) of the page corresponding to the access request (S1302). Next, the CPU 136 compares the updated access frequency 6505 with the predetermined access frequency threshold IO_th1 and performs determination (S1303).

The access frequency threshold IO_th1 can be the following:

(CV1) a constant value determined in advance by the storage subsystem;

(CV2) a value assigned by the types of the storage drive, such as the HDD or the SDD;

(CV3) a value designated by the system administrator;

(CV4) a variable value set based on the capacity of the storage drive;

(CV5) a value that changes by the failure occurrence rate of the storage drive such as the HDD or the SDD.

In step S1303, if the access frequency 6505 is below the access frequency threshold IO_th1, the CPU 136 ends the process without executing page blockage. In step S1303, if the access frequency 6505 has exceeded the access frequency threshold IO_th1, the CPU 136 selects a free page of either the same DP-RG or a different DP-RG from an RG-LU unallocated page queue 66.

The CPU 136 updates the page allocation status 6503 of the selected migration destination page (page configuration information management table 650 of FIG. 9) from "unallocated" to "allocated" (S1304). The migration destination page can be selected from the same DP-RG or from a different DP-RG, but from the viewpoint of load distribution, it is preferable to select a page from a different DP-RG. Further, as described later, the migration destination page can be determined by considering the number of blocked pages or the ratio of blocked pages of the migration destination DP-RG. Further, it is possible to select a DP-RG considering the access frequency of each DP-RG so as to select the DP-RG having a small access frequency, for example.

Next, the CPU 136 migrates the data in the migration source page to the migration destination page (S1305). After completing the migration of data, the CPU 136 changes the pointer 648 of the virtual address block information 64 from the state pointing to the page address information 658 of the migration source page to the state pointing to the page address information 659 of the migration destination page (S1306).

Lastly, the CPU 136 updates the page storage area status 6506 (page configuration information management table 650) of the migration source page from "normal" to "blocked" (S1307). Further, the status of progression of the process, the contents of each management table and the update statuses thereof can be monitored by the management terminal 40. As described, by designating a free page of a DP-RG that differs from the DP-RG to which the failure page belongs as the migration destination page and migrating data of the failure occurrence page thereto, the risk of data loss caused by double failure of the HDD drive can be reduced.

<Application Operation 1 of Partial Blockage of HDD During HDD Failure>

Figure 14:
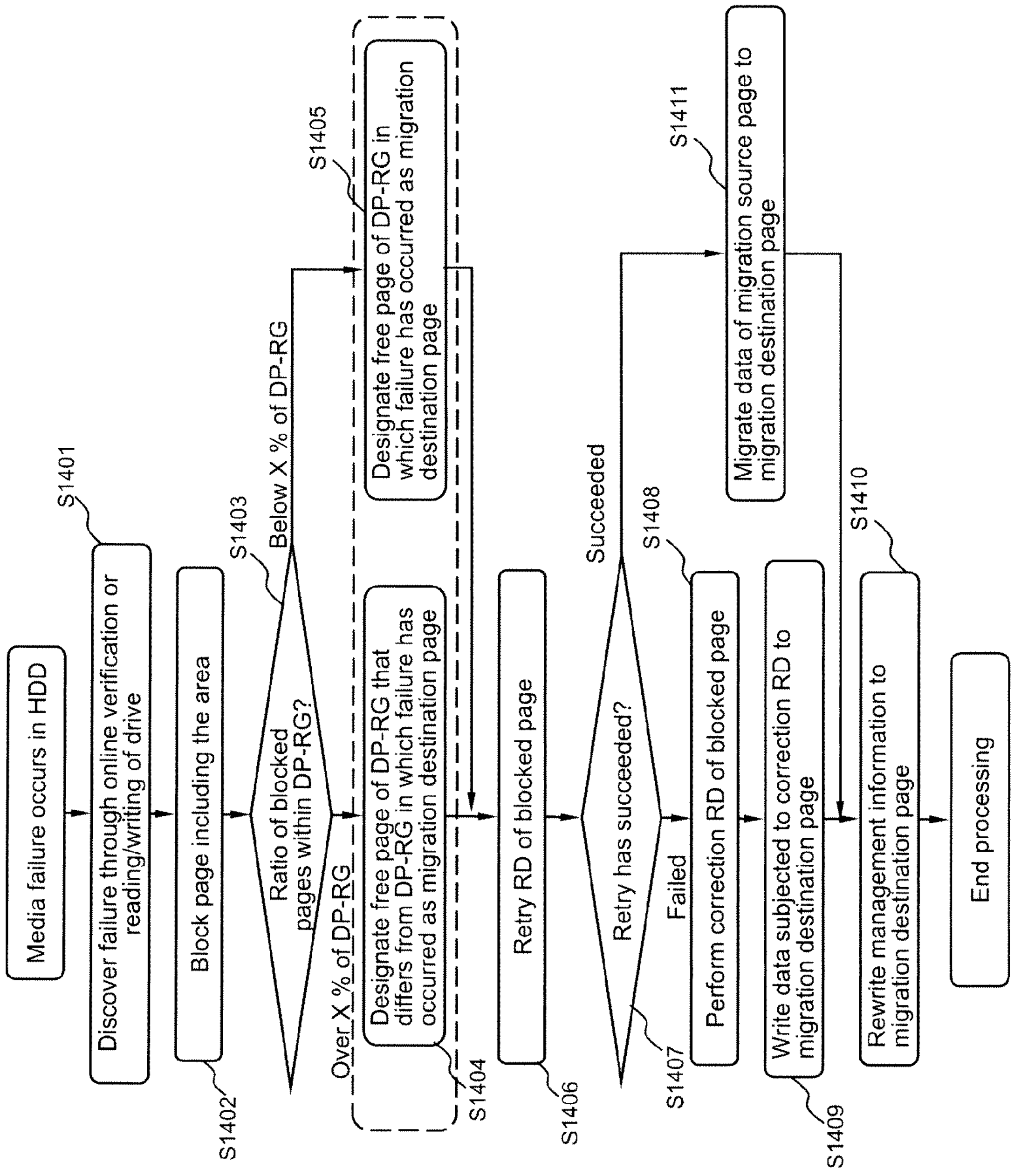
FIG. 14 is a flowchart showing an application operation 1 of partial blockage of HDD when HDD failure occurs.

FIG. 14 is a flowchart illustrating an application operation 1 of a partial blockage of the HDD when HDD failure has occurred. The processing of FIG. 14 is executed by selecting a migration destination page based on the ratio of blocked pages (number of blocked pages) within the DP-RG. In other words, the process has added a variation (steps S1403 through S1405) to the process of selecting the migration destination page in the basic operation of partial blockage of the HDD when HDD failure has occurred shown in FIG. 11.

If the ratio of the number of blocked pages within the same DP-RG has exceeded a certain constant value, the probability of occurrence of failure increases even in a normal page within the same DP-RG. Under such circumstances, even if the data of the failure page is migrated to the free page within the same DP-RG, there is a high possibility that failure occurs in the migration destination page, requiring re-migration of data.

There is also a possibility that data migration occurs continuously, and the continuous data migration processing may become the cause of deterioration of the processing performance or the access performance of the storage subsystem 10. Therefore, according to the present invention, the process such as that illustrated in FIG. 14 is executed so as to reduce continuous data migration operations. The differences between the processes of FIG. 14 and FIG. 11 (application area) will be described.

Similar to FIG. 12, the present process is executed by the CPU 136 when failure is found and the failure counter value has exceeded a threshold value. After the failure page has been blocked, the CPU 136 acquires a total page number TP1 and a blocked page number BP1 of the DP-RG to which the failure page belongs from the DP-RG number 6504 and the page storage area status 6506 of the page configuration information management table 650.

That is, if the DP-RG number to which the failure page belongs is "0", the pages having "0" as the DP-RG number 6504 in the page configuration information management table 650 are sorted out, and the number of such pages is set as the total page number of the DP-RG to which the failure page belongs. Then, based on the page storage area status 6506 corresponding to the sorted pages, the pages in blocked states are sorted out, and the number of pages thereof is set as the number of blocked pages. Further, the total number of pages belonging to the relevant DP-RG or the number of blocked pages can be managed via a pool RG index 67 of the mapping information management table.

Next, the CPU 136 divides the number of blocked pages BP1 by a total page number TP1 to calculate the ratio of blocked pages BLR (=BP1/TP1) (%). Then, the calculated ratio of blocked pages BLR and the predetermined threshold X (%) are compared (S1403). The ratio of the blocked pages can be a fixed value or a variable value varied according to the operation status of the storage subsystem.

The threshold value X (%) of the storage subsystem to which the present invention is applied is approximately 10%. Since it is important to ensure data reliability in storage subsystems, the threshold must be set low so as to enhance reliability. The reliability can be improved by setting a low threshold, but in contrast, the lifetime of the storage devices such as the HDD can be elongated by setting a high threshold. Therefore, the threshold should be determined to correspond to the specification of the product to which the present invention is applied.

If the ratio of blocked pages BLR is greater than threshold X (%), the CPU 136 executes step S1404, and if the ratio is smaller than threshold X (%), the CPU 136 executes step S1405.

In step S1404, the CPU 136 selects a free page belonging to a DP-RG that differs from the DP-RG in which the failure page belongs from the RG-LU unallocated page queue 66. The selected unallocated page of the different DP-RG is designated as the migration destination page.

In step S1405, the CPU 136 selects a free page belonging to the same DP-RG as the DP-RG in which the failure page belongs (having the same DP-RG number) from the RG-LU unallocated page queue 66. The selected unallocated page of the same DP-RG is designated as the migration destination page.

After designating the migration destination page, the CPU 136 executes the processes of steps S1406 to S1411. The explanation of processes of steps S1406 through S1411 are omitted since it is equivalent to steps S1104 through S1109 of FIG. 11. In the above description, the selection of the migration destination page was switched based on the ratio of blocked pages, but it can also be switched based on the number of blocked pages.

As described, if the ratio of the number of blocked pages within the same DP-RG exceeds a certain constant value, a free page of a different DP-RG is selected as the migration destination page so as to suppress continuous data migration and prevent deterioration of the processing performance and access performance of the storage subsystem.

<Application Operation 1 of Page Blockage by Access Frequency>

Figure 15:
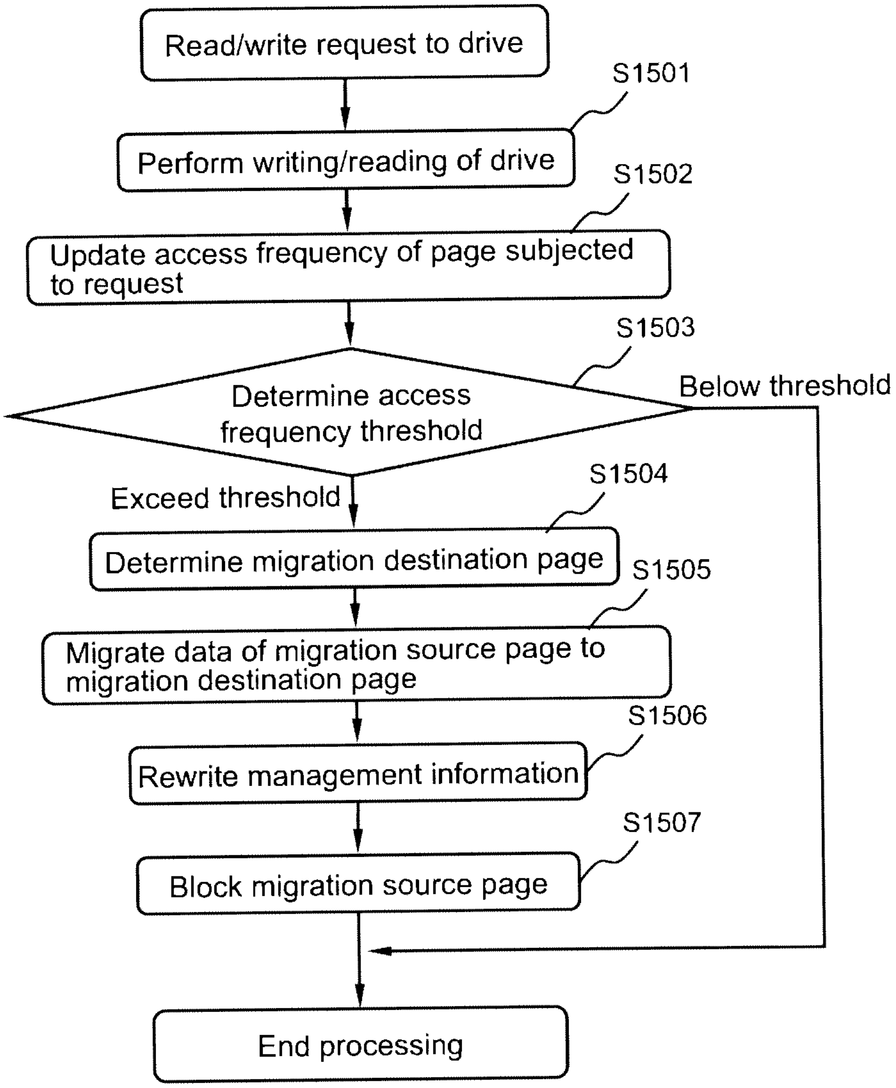
FIG. 15 is a flowchart showing an application operation 1 of page blockage based on access frequency.

FIG. 15 is a flowchart showing application operation 1 of page blockage based on access frequency. The characteristic feature of the present example is that the access frequency threshold is varied by the number of blocked pages of the DP-RG. If the number of blocked pages is high and the access frequency is also high, it is possible that pages in which failure will newly occur are increased, by which concentration of data migration of pages may occur, influencing the access performance of the storage subsystem 10.

Therefore, as shown in the following expression 1, by setting the access frequency threshold to become smaller as the number of blocked pages of the DP-RG becomes higher, data migration can be performed by selecting a free page of a different DP-RG as the migration destination page before the IO access frequency becomes high and page failure occurs.

Access frequency threshold $IO\_th2$=Basic threshold $IO_bs-k\times$Number of blocked pages     Expression 1

(Coefficient k: Fixed value or variable value varied for example based on the number of blocked pages per unit time)

The number of blocked pages is comprehended by the page storage area status 6505 of the page configuration information management table 650. Further, as shown in FIG. 14, the access frequency threshold IO_th2 can be calculated using a ratio of blocked pages instead of the number of blocked pages.

In FIG. 15, the CPU 136 compares the current access frequency with the above-described access frequency threshold IO_th2 in step S1503. If the access frequency exceeds the access frequency threshold IO_th2, the CPU 136 executes the processes of steps S1504 and thereafter. The processes of steps S1504 through S1507 are the same as the processes of steps S1304 through 1307 of FIG. 13, so the detailed descriptions thereof are omitted. If the access frequency is below the access frequency threshold IO_th2, the CPU 136 ends the process without executing page blockage.

<Application Operation 1 of Page Blockage by Access Frequency>

Figure 16:
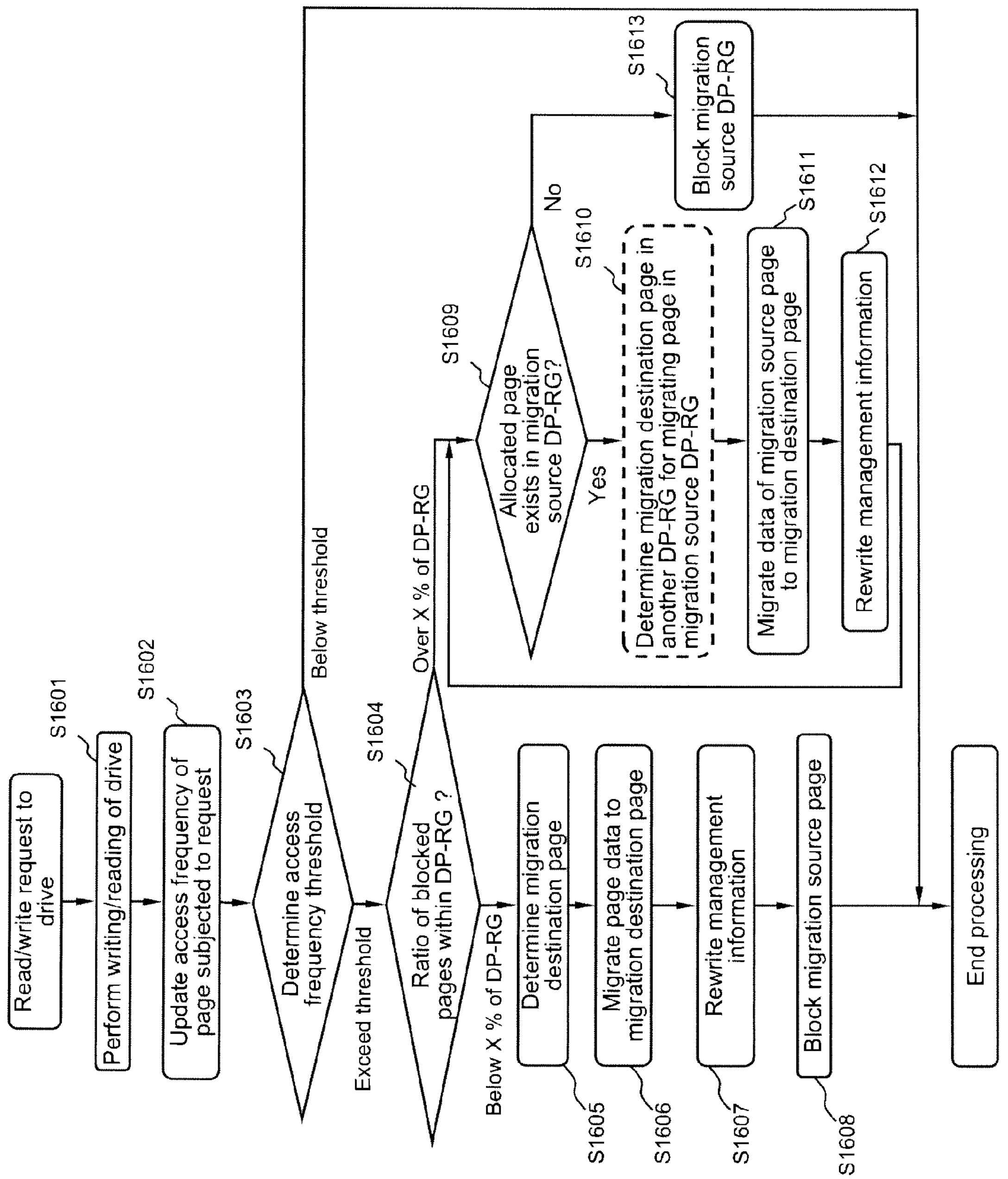
FIG. 16 is a flowchart showing an application operation 2 of page blockage based on access frequency.
Figure 17:
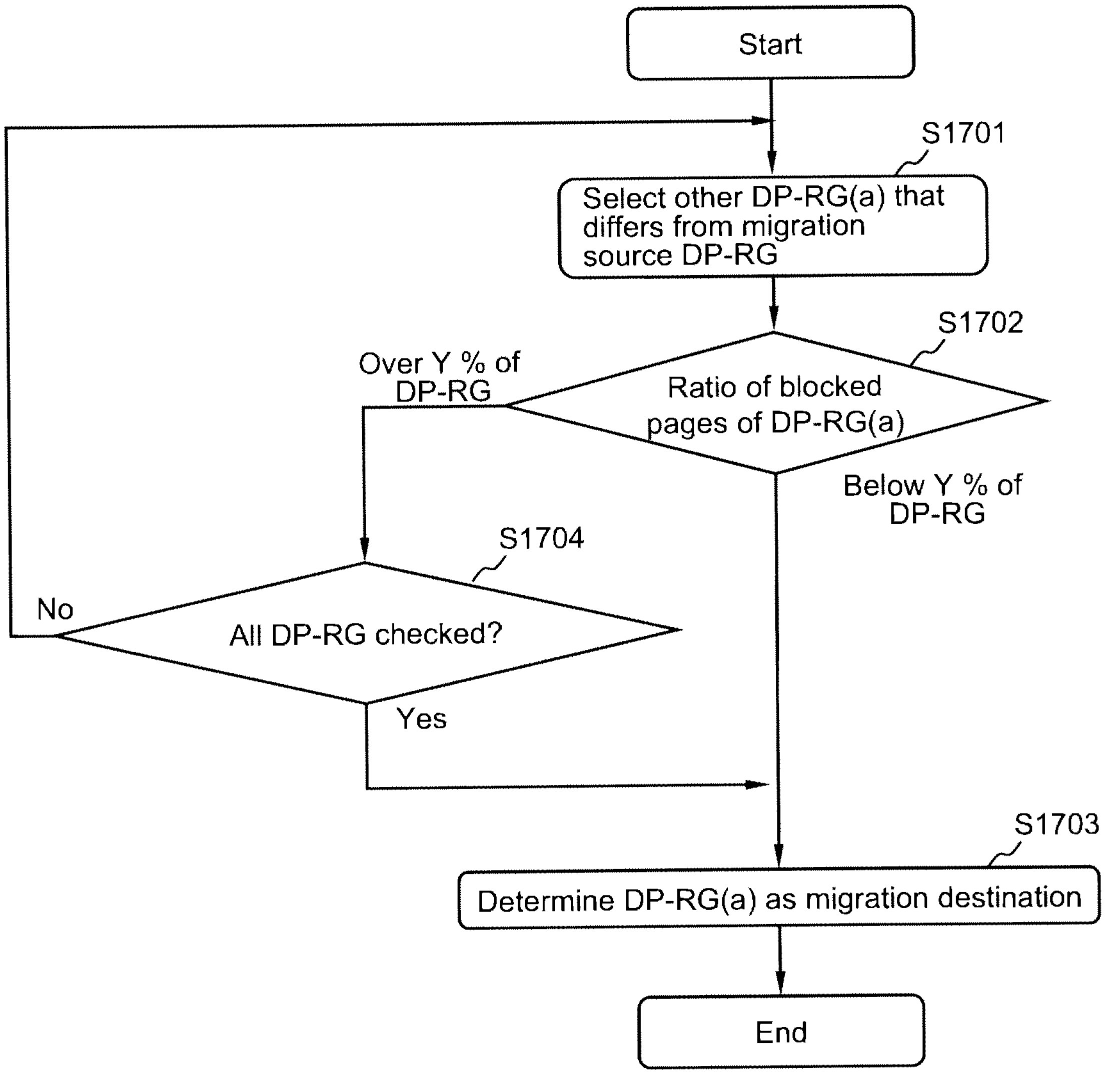
FIG. 17 is a flowchart showing a determination operation of migration destination DP (Dynamic Provisioning)-RG (RAID Group).

FIG. 16 is a flowchart illustrating application operation 2 of page blockage by access frequency. FIG. 17 is a flowchart illustrating the operation of determining the migration destination page of the migration destination DP-RG.

Next, the process of executing data migration and blockage of the whole DP-RG so as to protect data when the IO access frequency has exceeded a certain constant value and the number of blocked pages within the DP-RG or the ratio of blocked pages thereof becomes greater than a certain value will be described with reference to FIG. 16. Further, the method for determining the migration destination DP-RG in the process of FIG. 16 will be described in FIG. 17.

At first, a write access request or a read access request is sent from the host computer 31 or the like to the storage drive 23 (S1601). The CPU 136 updates the access frequency 6505 (page configuration information management table 650 of FIG. 9) of the page corresponding to the access request (S1602).

Next, the CPU 136 compares the updated access frequency 6505 with a predetermined access frequency threshold IO_th3 and performs determination (S1603). The access frequency threshold IO_th3 can be the same value as the aforementioned access frequency threshold IO_th1 (FIG. 13) or the access frequency threshold IO_th2 (FIG. 15), or can be a different value.

In step S1603, if the access frequency 6505 is smaller than the access frequency threshold IO_th3, the CPU 136 ends the present process without executing page blockage. In step S1603, if the access frequency 6505 exceeds the access frequency threshold IO_th3, the CPU 136 uses the page configuration information management table 650 to calculate the ratio of blocked pages based on the number of blocked pages and the total number of pages, and compares the same with a predetermined threshold X (%) (S1604).

In step S1604, if the ratio of blocked pages is below threshold X, the CPU 136 selects a free page having the same DP-RG number from the RG-LU unallocated page queue 66 in step S1605 (S1605). Then, data migration of the migration source page and the update of management information such as the page configuration information management table 650 of steps S1606 through S1608 are performed, and the blockage processing is ended. The processes of steps S1605 through S1608 are the same as the processes of steps S1304 through S1307 of FIG. 13, so the detailed description thereof are omitted.

In step S1604, if the ratio of blocked pages exceeds threshold X, the CPU 136 executes the DP-RG blockage processing of steps S1609 through S1613. At first, the CPU 136 determines whether an allocated page exists or not within the migration source DP-RG (S1609). If an allocated page exists, the CPU 136 determines a migration destination page of another DP-RG (migration destination DP-RG) regarding the page in the migration source DP-RG (S1610).

Next, a method for determining the migration destination page in another DP-RG will be described with reference to FIG. 17. At first, the CPU 136 selects another DP-RG(a) that differs from the migration source DP-RG in the mapping information management table 60 (S1701).

Next, the CPU 136 computes a ratio of blocked pages of the selected DP-RG (a) from the page storage area status 6506 of the page configuration information management table 650, and compares the same with a predetermined threshold Y (%) (S1702). The comparison and determination in step S1702 can also be performed based on the number of blocked pages instead of the ratio of blocked pages. The threshold Y in the storage subsystem to which the present invention is applied is approximately 5 to 10%, but the threshold Y (%) should preferably be smaller than the aforementioned threshold X (%) considering the migration of multiple pages and the allocation of future migration destination pages.

If the ratio of blocked pages of the selected DP-RG(a) is smaller than the predetermined threshold Y, the CPU 136 selects the present DP-RG(a) as the migration destination DP-RG (S1703).

If the ratio of blocked pages is greater than threshold Y, the CPU 136 determines whether the check of all the DP-RGs have been completed (S1704). If there is a DP-RG to be checked (S1704: No), the CPU 136 repeats the processing of steps S1701 and S1702. According to the processes of steps S1701 through S1704, it becomes possible to select a DP-RG having a small ratio of blocked pages or small number of blocked pages.

Further, in order to planarize the states of blocked pages in DP-RGs, it is possible to check the number of blocked pages or the ratio of blocked pages of all the DP-RGs and select the DP-RG having the least number of blocked pages or the smallest ratio of blocked pages. Moreover, the DP-RG determining method illustrated in FIG. 17 can be applied to the aforementioned selection of another DP-RG (such as step S1103 of FIG. 11). It is possible to replace the ratio of blocked pages of the DP-RG(a) with the access frequency of the DP-RG(a) and select the DP-RG(a) through comparison with a certain access frequency threshold, or select the DP-RG(a) through both the ratio of blocked pages and the access frequency.

We will now return to the description of FIG. 16. The CPU 136 selects a free page (migration destination page) in the DP-RG(a) determined in FIG. 17 from the RG-LU unallocated page queue 66, and migrates the data of the migration source page to the selected migration destination page (S1611).

After data migration is completed, the CPU 136 changes the pointer 648 of the virtual address block information 64 from the state pointing to the migration source page 658 to the state pointing to a migration destination page 659. The CPU 136 updates the page storage area status 6506 of the migration source page (page configuration information management table 650 of FIG. 9) from "normal" to "blocked" (S1612).

Next, the CPU 136 re-executes the processes of steps S1609 and thereafter until there is no more allocated page within the migration source DP-RG.

When the migration of data in the allocated pages within the migration source DP-RG to another DP-RG(a) is completed, the CPU 136 updates the mapping information management table 60 and the page configuration information management table 650 so as to block the whole migration source DP-RG (S1613).

As described, by designating a free page of another DP-RG having a small number of blocked pages (small ratio of blocked pages) that differs from the DP-RG to which the failure page belongs as the migration destination page, and migrating the data in the DP-RG to which the failure page belongs, it becomes possible to reduce the risk of data loss caused by double failure of the HDD drive.

<Application Operation 2 of Partial Blockage of HDD During HDD Failure>

Figure 18:
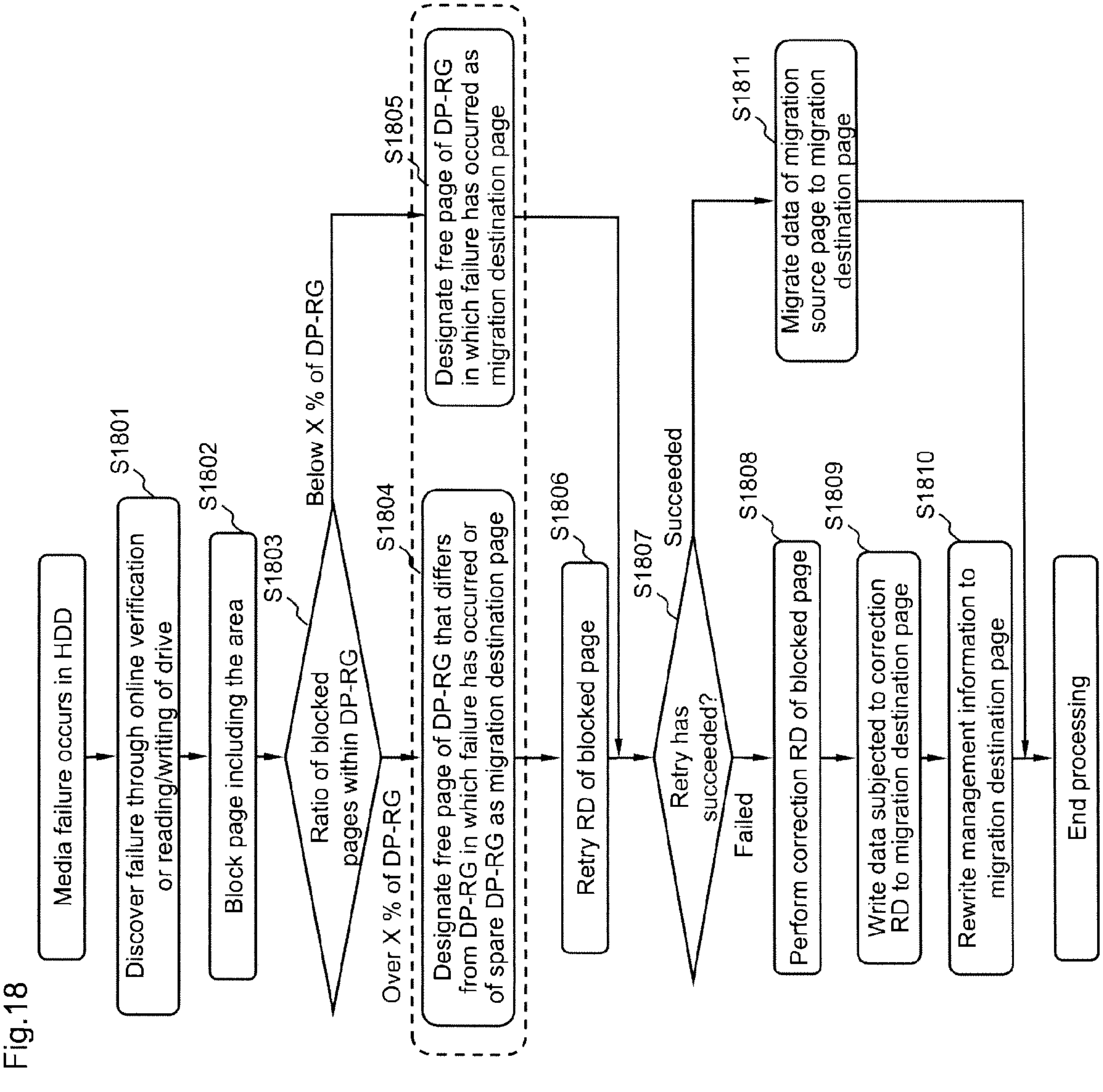
FIG. 18 is a flowchart showing an application operation 2 of partial blockage of HDD when HDD failure occurs.

FIG. 18 is a flowchart showing an application operation 2 of partial blockage of the HDD when HDD failure occurs. According to this process, if a spare DP-RG exists upon selecting another DP-RG, the free page of the spare DP-RG is designated as the migration destination page.

Actually, if the ratio of blocked pages exceeds a threshold X (%) in step S1803, the CPU 136 sets the spare DP-RG as the different DP-RG in step S1804. Then, the CPU 136 selects a free page of the spare DP-RG as the migration destination page from the RG-LU unallocated page queue 66, and performs migration of data and update of the management information. If the ratio of blocked pages is smaller than threshold X (%), the CPU 136 selects a free page within the same DP-RG as the migration destination page in step S1805.

The processes of steps S1806 and thereafter are the same as the processes described in FIG. 14 and the like, so the detailed descriptions thereof are omitted. It is also possible to select a free page of another DP-RG including the spare DP-RG as the migration destination page. In that case, it is possible to prioritize selection of the spare DP-RG as the DP-RG of the migration destination page.

Also according to the present process, the risk of data loss caused by double failure of the HDD drive can be reduced by designating a free page of the spare DP-RG that differs from the DP-RG to which the failure page belongs as the migration destination page and migrating data in the failure page thereto.

According to the above description, the partial blockage of the HDD has been illustrated as an example, but the present invention is also applicable to storage drives such as SSDs and optical disks.

Further, it is possible to combine the partial blockage processing and the whole blockage processing in a single storage subsystem 10. A SATA type HDD 231 is appropriate as the storage drive for executing the process having combined the partial blockage and the whole blockage. Further, a SAS type HDD 230 or a SSD 232 is appropriate as the storage drive to which only the whole blockage processing is applied.

Furthermore, in the above description, DP (Dynamic Provisioning) page units (32 MB or 42 MB) has been illustrated as the units of partial blockage, but the units are not restricted thereto, and partial blockage can be performed in chunk units. Partial blockage can be performed in units smaller than 32 MB, such as 1 MB units, though the size of the management information table will be increased. In contrast, it is also possible to perform partial blockage in 1 GB units, for example, so as to reduce the size of the management information table.

As described, according to the present invention, only a partial area of the interior of the HDD can be blocked instead of blocking the whole HDD when failure occurs, so that the risk of data loss caused by double failure of the HDD constituting the same RAID group can be reduced. Further, since the storage areas other than the section where failure has occurred can be used in continuation, the life of the HDD can be elongated.

Further, since failure occurs more frequently in SATA drives designed for consumers having a greater capacity but is inexpensive than SATA drives and SAS drives designed for enterprises, the effect of the present invention becomes even more significant.

REFERENCE SIGNS LIST

1 Storage system
10 Storage subsystem
20 Logical volume
21 Storage pool
22 RAID group
23 Storage drive
30, 31 Host device
40 Management terminal

50 Storage network
60 Mapping information management table
61 Pool index
62 Virtual volume index
63 Virtual address index
64 Virtual address block
65 Page address information
66 RG-volume unallocated page queue
67 RG index
68 Chunk index
71 Page
72 Chunk
81 Virtual page
101 Basic chassis
102 Expanded chassis
105 Internal bus
106 Connection line
130 Controller unit
131 Communication OF
132 Data transfer controller (DTCL)
133 Drive I/F
134 Cache memory (CM)
135 Bridge
136 CPU
137 Shared memory
138 EXP switch
171, 172 HDD drive
200 Normal volume
201, 202, 203 Virtual volume
650 Page configuration information management table
658 Migration source page address information
659 Migration destination page address information
700 Failure count management table
701, 702, 703, 704 HDD
705 DP-RG
710, 711, 712, 713, 714, 715, 716 Page
730 Data string
731 Parity cycle
6501 Page number
6502 LU number
6503 Page status
6504 DP-RG number
6505 Access frequency
6506 Page storage area status
6507 Failure count value
7001 Content of failure
7002 Failure count add value

The invention claimed is:

1. A storage subsystem coupled to a host computer, the storage subsystem comprising:

a storage device unit having a plurality of storage devices configured to store data sent from the host computer;

a management unit configured to manage the storage device unit, wherein the management unit is configured to divide the storage device unit into storage areas of predetermined units; select a data migration destination storage area when failure occurs to a storage area; and migrate data stored in the storage area where failure has occurred to a storage area of the data migration destination, and block the storage area where failure has occurred; and a RAID group comprising two or more of the storage areas, wherein the data migration destination storage area is selected from either a first RAID group to which the storage area where failure has occurred belongs or a second RAID group that differs from the first RAID group, and data is migrated thereto, and wherein a data migration destination RAID group is selected based on either a number of blocked storage areas or a ratio of blocked storage areas in the first RAID group.

2. The storage subsystem according to claim 1, wherein when the number of blocked storage areas or the ratio of blocked storage areas in the first RAID group is below a first blockage threshold, the first RAID group is selected as the data migration destination RAID group; and when the number of blocked storage areas or the ratio of blocked storage areas in the first RAID group exceeds the first blockage threshold, the second RAID group is selected as the data migration destination RAID group.

3. The storage subsystem according to claim 1, wherein the data migration destination RAID group is selected from a RAID group other than the first RAID group and having the number of blocked storage areas or the ratio of blocked storage areas smaller than a second blockage threshold.

4. The storage subsystem according to claim 1, wherein the second RAID group is a spare RAID group that is not used for performing normal operation of the storage subsystem.

5. A storage subsystem coupled to a host computer, the storage subsystem comprising:

a storage device unit having a plurality of storage devices configured to store data sent from the host computer;

a management unit configured to manage the storage device unit, wherein the management unit is configured to divide the storage device unit into storage areas of predetermined units; and select a data migration storage area when an IO access frequency from the host computer to the storage area exceeds a first access frequency threshold set in advance, migrate the data stored in the storage area to the storage area of the data migration destination, and block the storage area; and a RAID group comprised of two or more of the storage areas, wherein the data migration destination storage area is selected from either a first RAID group to which the storage area where IO access frequency exceeds the first access frequency threshold belongs or a second RAID group that differs from the first RAID group, and data is migrated thereto, and wherein a data migration destination RAID group is selected based on either a number of blocked storage areas or a ratio of blocked storage areas in the first RAID group.

6. The storage subsystem according to claim 5, wherein when the number of blocked storage areas or the ratio of blocked storage areas in the first RAID group is below a first blockage threshold, the first RAID group is selected as the data migration destination RAID group; and when the number of blocked storage areas or the ratio of blocked storage areas in the first RAID group exceeds the first blockage threshold, the second RAID group is selected as the data migration destination RAID group.

7. The storage subsystem according to claim 6, wherein the data migration destination RAID group is selected from a RAID group other than the first RAID group and having the number of blocked storage areas or the ratio of blocked storage areas smaller than a second blockage threshold.

8. The storage subsystem according to claim 5, wherein the first access frequency threshold is a value that varies according to the number of blocked storage areas or the ratio of blocked storage areas in the first RAID group.

9. The storage subsystem according to claim 5, wherein when an access frequency of the whole first RAID group is below a second access frequency threshold, the first RAID group is set as the data migration destination RAID group, and when the access frequency exceeds the second access frequency threshold, the second RAID group is set as the data migration destination RAID group.

10. The storage subsystem according to claim 6, wherein the data migration destination RAID group is selected from a RAID group other than the first RAID group and having the number of blocked storage areas or ratio of blocked storage areas below a third access frequency threshold.

11. A data management method of a storage subsystem coupled to a host computer, the storage subsystem comprising:

a storage device unit having a plurality of storage devices for storing data sent from the host computer; and a management unit for managing the storage device unit;

wherein the management unit is configured to divide the storage device unit into storage areas of predetermined units and constitute a RAID group from two or more of said storage areas; select a data migration destination storage area when failure occurs to the storage area; and migrate data stored in the storage area where failure has occurred to the storage area of the data migration destination, and block the storage area where failure has occurred, wherein the data migration destination storage area is selected from either a first RAID group to which the storage area in which failure has occurred belongs or a second RAID group that differs from the first RAID group, and data is migrated thereto, wherein a data migration destination RAID is selected based on either a number of blocked storage areas or a ratio of blocked storage areas in the first RAID group.

12. The data management method according to claim 11, wherein when the number of blocked storage areas or the ratio of blocked storage areas in the first RAID group is below a first blockage threshold, the first RAID group is selected as the data migration destination RAID group; and when the number of blocked storage areas or the ratio of blocked storage areas in the first RAID group exceeds the first blockage threshold, the second RAID group is selected as the data migration destination RAID group.

* * * * *